(12) United States Patent
Okada et al.

(10) Patent No.: US 10,919,108 B2
(45) Date of Patent: Feb. 16, 2021

(54) CONFIGURED TO SET THE PLUNGING FORCE

(71) Applicant: KAWASAKI JUKOGYO KABUSHIKI KAISHA, Kobe (JP)

(72) Inventors: Hideki Okada, Kakamigahara (JP); Shuhei Yoshikawa, Kobe (JP); Kenichi Kamimuki, Kakamigahara (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 237 days.

(21) Appl. No.: 15/759,969

(22) PCT Filed: Sep. 13, 2016

(86) PCT No.: PCT/JP2016/076940
§ 371 (c)(1),
(2) Date: Mar. 14, 2018

(87) PCT Pub. No.: WO2017/047574
PCT Pub. Date: Mar. 23, 2017

(65) Prior Publication Data
US 2018/0257169 A1 Sep. 13, 2018

(30) Foreign Application Priority Data

Sep. 14, 2015 (JP) .................................. 2015-180461

(51) Int. Cl.
*B23K 20/12* (2006.01)
*B23K 101/18* (2006.01)
*B23K 103/10* (2006.01)

(52) U.S. Cl.
CPC .......... *B23K 20/126* (2013.01); *B23K 20/122* (2013.01); *B23K 20/129* (2013.01);
(Continued)

(58) Field of Classification Search
CPC ........................................... B23K 20/122–128
See application file for complete search history.

(56) References Cited

U.S. PATENT DOCUMENTS 7,032,801 B2 * 4/2006 Raether .............. B23K 20/1235
228/2.1
8,556,156 B1 * 10/2013 Bharadwaj ......... B23K 20/1235
228/102
(Continued)

FOREIGN PATENT DOCUMENTS

EP 3210711 A1 8/2017
JP 2007-30017 A 2/2007
(Continued)

OTHER PUBLICATIONS

Nov. 1, 2016 International Search Report issued in International Patent Application No. PCT/JP2016/076940.

*Primary Examiner* — Erin B Saad
*Assistant Examiner* — Carlos J Gamino
(74) *Attorney, Agent, or Firm* — Oliff PLC

(57) ABSTRACT

A friction stir spot welding device which welds an object to be welded, by softening the object by friction heat and by stirring the object, has a tool with a cylindrical shape, the tool being rotatable around an axis thereof, advanceable along a direction of the axis, and retractable along the direction of the axis, a temperature detector which detects a temperature of the tool when a welding step for the object starts, and a controller configured to compare the temperature of the tool which is detected by the temperature detector to a predetermined reference temperature to set a plunging force applied by the tool to press the object.

7 Claims, 13 Drawing Sheets

(52) U.S. Cl.
CPC ...... *B23K 20/1265* (2013.01); *B23K 2101/18* (2018.08); *B23K 2103/10* (2018.08)

(56) References Cited

U.S. PATENT DOCUMENTS

| | | | | |
|---|---|---|---|---|
| 8,657,179 | B1* | 2/2014 | Ding | B23K 20/1235 |
| | | | | 228/2.1 |
| 9,751,153 | B2* | 9/2017 | Ross | B23K 20/1235 |
| 10,201,873 | B2* | 2/2019 | Okada | B23K 20/12 |
| 2005/0051602 | A1* | 3/2005 | Babb | B23K 20/123 |
| | | | | 228/112.1 |
| 2008/0083817 | A1* | 4/2008 | Baumann | B23K 20/123 |
| | | | | 228/102 |
| 2009/0255980 | A1* | 10/2009 | Li | B23K 20/123 |
| | | | | 228/102 |
| 2012/0185075 | A1* | 7/2012 | Babb | B23K 20/1235 |
| | | | | 700/145 |
| 2014/0027496 | A1* | 1/2014 | Castillo | B23K 20/12 |
| | | | | 228/102 |
| 2014/0069986 | A1* | 3/2014 | Okada | B23K 20/1265 |
| | | | | 228/112.1 |
| 2016/0184922 | A1* | 6/2016 | Kikyo | B23K 20/1265 |
| | | | | 228/114.5 |
| 2017/0304935 | A1 | 10/2017 | Okada et al. | |
| 2018/0221987 | A1* | 8/2018 | Weigl | B23K 37/0276 |
| 2018/0243873 | A1* | 8/2018 | Yamamoto | B23Q 17/0995 |
| 2019/0262934 | A1* | 8/2019 | Ohashi | B23K 20/1235 |

FOREIGN PATENT DOCUMENTS

| | | |
|---|---|---|
| JP | 2012-196682 A | 10/2012 |
| WO | 2016/063538 | 4/2016 |

* cited by examiner

CONFIGURED TO SET THE PLUNGING FORCE

TECHNICAL FIELD

The present invention relates to a friction stir spot welding device and a friction stir spot welding method.

BACKGROUND ART

In transportation vehicles such as automobiles, railway vehicles, and aircraft, a resistance spot welding or rivet joining is used to join metal materials together. In recent years, an attention has been paid to a method of welding (joining) the metal materials by utilizing friction heat (friction stir spot welding (joining) method) (see e.g., Patent Literature 1).

In the friction stir spot welding method disclosed in Patent Literature 1, a pin member with a substantially solid cylinder shape, and a shoulder member having a substantially tubular shape with a circular cross-section and a hollow space into which the pin member is insertable, are used to weld an object (materials to be welded). As described below, a tool driving section which actuates (drives) the pin member and the shoulder member (rotating tool) is controlled.

In a case where the cross-sectional area of the tip end of the pin member is designated by Ap, the cross-sectional area of the tip end of the shoulder member is designated by As, the plunge depth of the pin member plunged into the object from its obverse surface is designated by Pp, and the plunge depth of the shoulder member plunged into the object from its obverse surface is designated by Ps, the tool driving section is controlled so that the absolute value of a tool average position Tx defined by $Ap \cdot Pp + As \cdot Ps = Tx$ is reduced.

With this control, it becomes possible to realize a high accuracy and a good welding quality depending on welding conditions, and prevent or suppress generation of defectives of inner cavities.

CITATION LIST

Patent Literature

Patent Literature 1: Japanese Laid-Open Patent Application Publication No. 2012-196682

SUMMARY OF INVENTION

Technical Problem

In a case where the state of a welding tool (including a backing member) is significantly changed while a friction stir spot welding device is welding an object to be welded, in particular, a case where serial spots welding for the object is performed, the external appearance is degraded. The present inventors intensively studied this problem, and found the following phenomenon. Heat is accumulated in the welding tool (including the backing member), the material is softened by heat transferred from the welding tool and moves to a region that is outward of a clamp member, the material present below the clamp member is plasticized, a welded region and the clamp member are depressed, or the clamp member is raised, compared to a case where single spot welding for the object is performed.

The present invention has been developed to solve the above-described problem, and an object of the present invention is to provide a friction stir spot welding device and a friction stir spot welding method, which can realize a good welding quality even in a case where serial spots friction stir welding is performed.

Solution to Problem

To solve the above-described problem, according to the present invention, there is provided a friction stir spot welding device which welds an object to be welded, by softening the object by friction heat and by stirring the object, comprises a tool with a cylindrical shape, the tool being rotatable around an axis thereof, advanceable along a direction of the axis, and retractable along the direction of the axis; a temperature detector which detects a temperature of the tool; and a controller configured to, in a case where serial spots welding is performed for the object, compare the temperature of the tool which is detected by the temperature detector in a period which passes from end of a welding step for the object until start of a next welding step for the object, to a predetermined reference temperature, to set a plunging force applied by the tool to press the object in the next welding step.

In this configuration, a good welding quality can be realized even in a case where the serial spots welding is performed.

According to the present invention, there is provided a friction stir spot welding device which welds an object to be welded, by softening the object by friction heat and by stirring the object, the friction stir spot welding device comprising: a tool with a cylindrical shape, the tool being rotatable around an axis thereof, advanceable along a direction of the axis, and retractable along the direction of the axis; a temperature detector which detects a temperature of the tool; and a controller configured to, in a case where serial spots welding is performed for the object, compare the temperature of the tool which is detected by the temperature detector in a period which passes from end of a welding step for the object until start of a next welding step for the object, to a predetermined reference temperature, to set a rotational speed of the tool in the next welding step.

In this configuration, a good welding quality can be realized even in a case where the serial spots welding is performed.

According to the present invention, there is provided a friction stir spot welding device which welds an object to be welded, by softening the object by friction heat and by stirring the object, comprises a tool with a cylindrical shape, the tool being rotatable around an axis thereof, advanceable along a direction of the axis, and retractable along the direction of the axis; a temperature detector which detects a temperature of the tool; and a controller configured to, in a case where serial spots welding is performed for the object, compare the temperature of the tool which is detected by the temperature detector in a period which passes from end of a welding step for the object until start of a next welding step for the object, to a predetermined reference temperature, to set actuation time of the tool in the next welding step.

In this configuration, a good welding quality can be realized even in a case where the serial spots welding is performed.

According to the present invention, there is provided a friction stir spot welding method which welds an object to be welded, by softening the object by friction heat and by stirring the object, comprises: in a case where serial spots welding is performed for the object, (A) detecting a temperature of a tool by a temperature detector, in a period which passes from end of a welding step for the object until start of a next welding step for the object; and (B) comparing the temperature of the tool which is detected by the temperature detector in the (A) to a predetermined reference temperature, to set a plunging force applied by the tool to press the object in the next welding step.

In this method, a good welding quality can be realized even in a case where the serial spots welding is performed.

In the friction stir spot welding method, in the (A), the temperature detector may detect the temperature of the tool, when the welding step for the object starts.

In the friction stir spot welding method, in the (B), the plunging force applied by the tool to press the object may be reduced so that the plunging force is less than the plunging force at the predetermined reference temperature, in a case where the temperature of the tool which is detected by the temperature detector is higher that the predetermined reference temperature.

In the friction stir spot welding method, in the (B), the plunging force applied by the tool to press the object may be set based on a difference between the predetermined reference temperature and the temperature of the tool which is detected by the temperature detector.

In the friction stir spot welding method, the predetermined reference temperature may include a first predetermined reference temperature and a second predetermined reference temperature which is higher than that first predetermined reference temperature, and when the first predetermined reference temperature is designated by T1, the second predetermined reference temperature is designated by T2, the temperature of the tool which is detected by the temperature detector is designated by Tn, the plunging force applied by the tool to press the object at the first predetermined reference temperature is designated by F1, and the plunging force applied by the tool to press the object at the second predetermined reference temperature is designated by F2, a plunging force Fn applied by the tool to press the object at the temperature Tn may be set according to a formula $Fn=F1-(Tn-T1)/(T2-T1) \times F2$, in the (B).

The friction stir spot welding method may further comprise: (C) comparing the temperature of the tool which is detected by the temperature detector in the (A) to the predetermined reference temperature, to set a rotational speed of the tool in the next welding step.

According to the present invention, there is provided a friction stir spot welding method which welds an object to be welded, by softening the object by friction heat and by stirring the object, comprises in a case where serial spots welding is performed for the object, (A) detecting a temperature of a tool by a temperature detector in a period which passes from end of a welding step for the object until start of a next welding step for the object; and (C) comparing the temperature of the tool which is detected by the temperature detector in the (A) to a predetermined reference temperature, to set a rotational speed of the tool in the next welding step.

In this method, a good welding quality can be realized even in a case where the serial spots welding is performed.

In the friction stir spot welding method, in the (C), the rotational speed of the tool may be reduced so that the rotational speed is lower than the rotational speed at the predetermined reference temperature, in a case where the temperature of the tool which is detected by the temperature detector is higher than the predetermined reference temperature.

The friction stir spot welding method may further comprise: (D) comparing the temperature of the tool which is detected by the temperature detector in the (A) to the predetermined reference temperature, to set actuation time of the tool in the next welding step.

A friction stir spot welding method which welds an object to be welded, by softening the object by friction heat and by stirring the object, comprises in a case where serial spots welding is performed for the object, (A) detecting a temperature of a tool by a temperature detector in a period which passes from end of a welding step for the object until start of a next welding step for the object; and (D) comparing the temperature of the tool which is detected by the temperature detector in the (A) to a predetermined reference temperature, to set actuation time of the tool in the next welding step.

In this method, a good welding quality can be realized even in a case where the serial spots welding is performed.

In the friction stir spot welding method, in the (D), the actuation time of the tool may be reduced so that the actuation time is shorter than actuation time at the predetermined reference temperature, in a case where the temperature of the tool which is detected by the temperature detector is higher than the predetermined reference temperature.

The above and further objects, features and advantages of the present invention will more fully be apparent from the following detailed description of preferred embodiments with reference to accompanying drawings.

Advantageous Effects of Invention

In accordance with a friction stir spot welding device and a friction stir spot welding method of the present invention, a good welding quality can be realized even in a case where the serial spots welding is performed.

DESCRIPTION OF EMBODIMENTS

The present inventors found that in a case where the serial spots welding is performed by the friction stir spot welding method disclosed in the above-described Patent Literature 1 and without sufficiently cooling the pin member and the shoulder member (hereinafter these will be referred to as a tool), a plasticized region spreads from a region immediately below the pin/shoulder, and the external appearance quality or the like of the object to be welded is degraded. The phrase "the serial spots welding is performed" means that a next welding step is performed without sufficiently cooling (e.g., air-cooling) the pin member and/or the shoulder member. This means that the welding step is performed in high cycles, including, for example, a case where the next welding step is initiated within a specified time (e.g., 2 seconds) after the previous welding step is finished, and/or a case where the next welding step is initiated in a state in which the temperature of the pin member and the temperature of the shoulder member are equal to or higher than a predetermined temperature when the next welding step starts.

The present inventors measured the temperature of the outer peripheral surface of a region of a clamp member which is in the vicinity of its tip end portion in cases where the spot welding for two aluminum alloy 2024-T3 Clad materials (plate thickness was 0.8 mm) was serially performed, by use of various cooling methods, and found that defectives of the external appearance occurred (in most cases, surface underfill of the welded regions) when the temperature was equal to or higher than 200 degrees C.

In addition, the present inventors conducted a test (hereinafter this will be referred to as a serial spots welding test) in which serial 40 welding spots were welded, under a condition in which two aluminum alloy materials A7075C-T6 (plate thickness was 1.27 mm) were lapped and wait time that passes from the end of welding of a certain welding region to the start of welding of a next welding region was set to 1 second. Note that in this serial spots welding test, the pin member and the shoulder member applied a predetermined equal plunging force to all of the welding regions of the object.

During the serial spots welding test, a temperature detector detected the tool temperature (the temperature of the outer peripheral surface of the region of the clamp member which was in the vicinity of its tip end portion) at the end of the welding of each of the welding regions, and the plunge depth (depth of the shoulder member from the obverse surface of the object) of the shoulder member from the obverse surface of the object was monitored. In addition, the underfill of each of the welded regions (depth from the obverse surface of the object) from the obverse surface of the object at the end of the welding was measured. The results are shown in FIG. 5.

Figure 5:
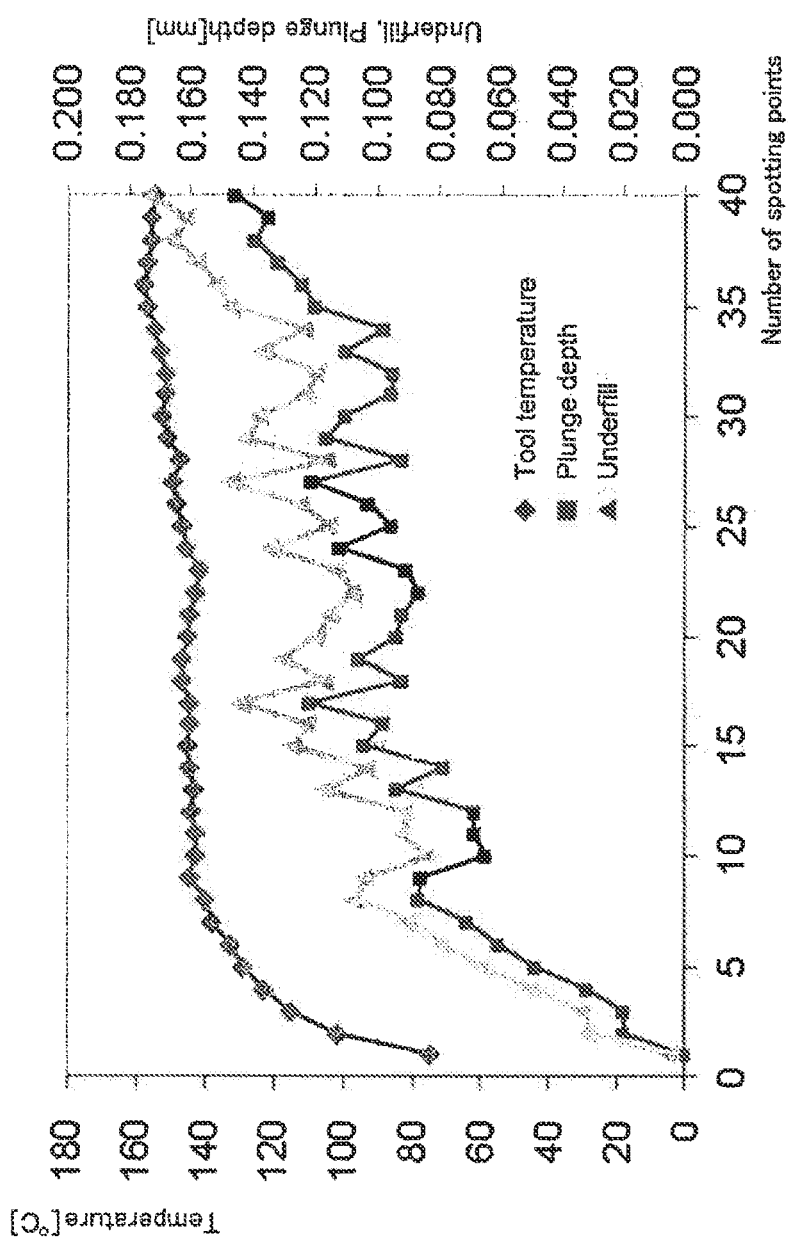
FIG. 5 is a graph showing a relationship among a tool temperature, and a plunge depth of a shoulder member and underfill of a welded region, in a case where a serial spots welding test is performed under a condition in which a plunging force is not changed.

In FIG. 5, each rhombus (♦) indicates the tool temperature, each rectangle (■) indicates an increase amount (value in a state in which the shoulder member is most plunged) of the plunge depth of the shoulder member, from a first spotting point, and each triangle (▲) indicates the underfill of each of the welded regions from the obverse surface of the object. The welding of 40-th spot will also be referred to as 40-th spotting point.

As can be seen from FIG. 5, with an increase in the tool temperature, the plunge depth of the shoulder member and the underfill of the welded region from the obverse surface of the object increased, and defectives of the external appearances occurred. Also, it was found that the tool temperature rapidly increased until 10-th spotting point, while the tool temperature gradually increased after the 10-th spotting point.

In contrast, under the condition in which the temperature of the shoulder member was cooled to a temperature which was equal to or lower than 20 to 60 degrees C., the defectives of the external appearances (in most cases, the underfill of the welded regions) did not occur, even though the welding was performed in repetition. The thresholds of these temperatures are different depending on the materials to be welded, the plate thickness of the materials to be welded, and the material of the shoulder member, and are not defined without any exception.

The present inventors presume as follows. The defectives of the external appearances or the like which occur in the case where the serial spots welding is performed is attributed to a fact that since the next welding is performed in a state in which heat generated by friction is accumulated in the pin member and the shoulder member, the metal material is softened in a shorter time compared to a case where single spot welding is performed, and as a result the softened material is increased in amount and flows to a region outside the shoulder member (a region on the clamp member side), in cases where the serial spots welding is performed under the same condition as that of the single spot welding, which is equal time, equal rotational speed, or equal plunging force.

In light of the above, the present inventors discovered the following. In a case where the serial spots welding is performed, the temperature of the tool (the pin member or the shoulder member) is detected in a period which passes until start of a next welding step for the object, and at least one of the parameters which are the plunging force applied by the tool, the rotational speed of the tool, and the actuation time of the tool, is set based on the temperature of the tool. This makes it possible to prevent the flow of the softened material to the region outside the shoulder member, and realize a good welding quality even in the case where the serial spots welding is performed. In this way, the present invention is conceived.

Specifically, the present inventors discovered that the above-described problem can be solved by reducing at least one of the parameters which are the plunging force applied by the tool to press the object, the rotational speed of the tool, and the actuation time of the tool, in a case where the temperature of the tool which is detected by the temperature detector in a period which passes from end of a welding step for the object until start of a next welding step for the object is higher than a first reference temperature.

Hereinafter, the preferred embodiments of the present invention will be described with reference to the drawings. Throughout the drawings, the same or corresponding constituents are designated by the same reference symbols and will not be described in repetition. Also, throughout the drawings, constituents required to explain the present invention are extracted and the other constituents are not shown in some cases. Further, the present invention is not limited by the embodiments described below.

Embodiment 1

A friction stir spot welding device according to Embodiment 1, which welds an object to be welded, by softening the object by friction heat and by stirring the object, comprises a tool with a cylindrical shape, the tool being rotatable around an axis thereof, advanceable along a direction of the axis, and retractable along the direction of the axis; a temperature detector which detects a temperature of the tool; and a controller configured to, in a case where serial spots welding is performed for the object, compare the temperature of the tool which is detected by the temperature detector in a period which passes from end of a welding step for the object until start of a next welding step for the object, to a predetermined reference temperature, to set a plunging force applied by the tool to press the object in the next welding step.

Hereinafter, an example of the friction stir spot welding device according to Embodiment 1 will be described in detail.

[Configuration of Friction Stir Spot Welding Device]

Figure 1:
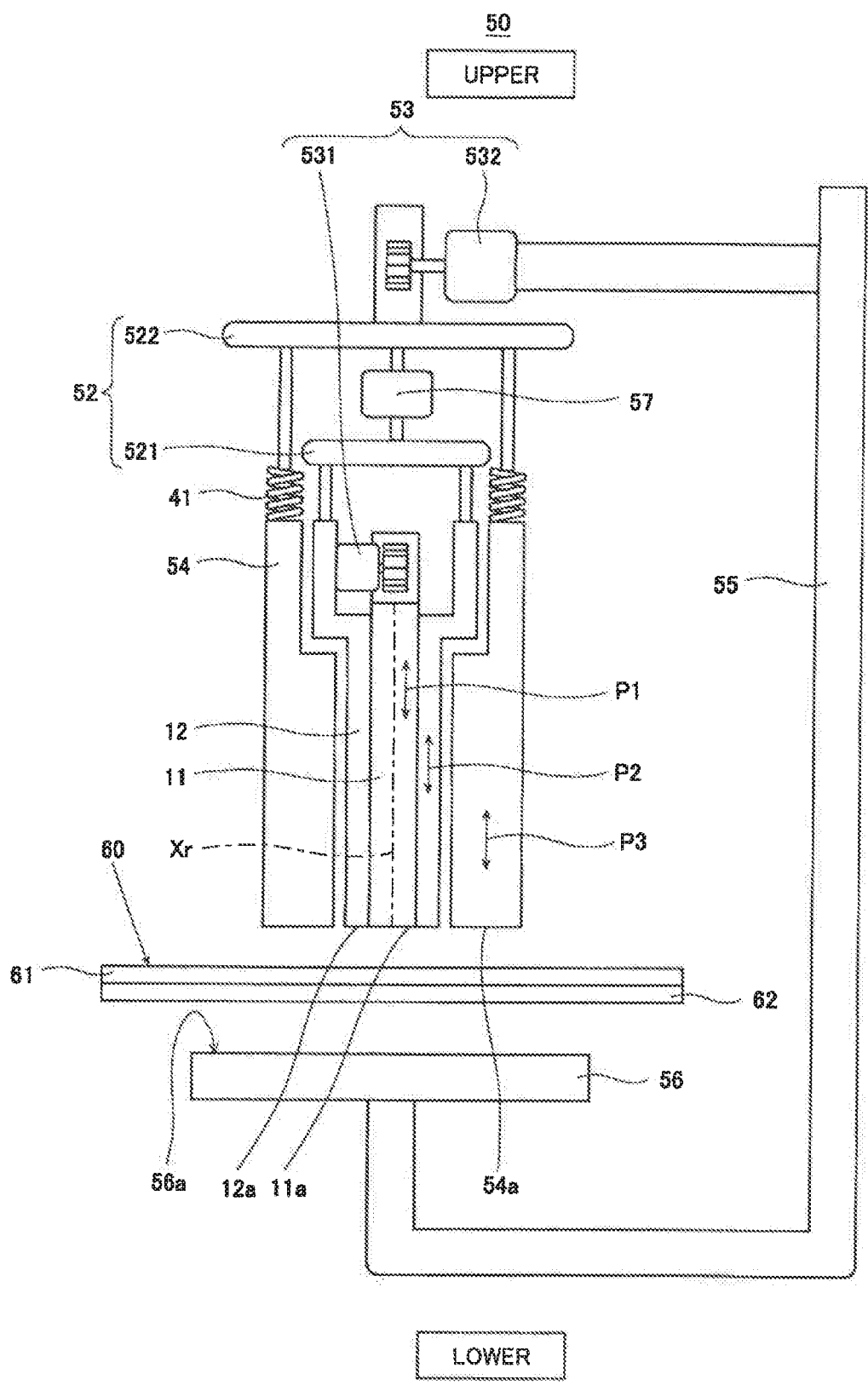
FIG. 1 is a schematic view showing the configuration of a friction stir spot welding device according to Embodiment 1.

FIG. 1 is a schematic view showing the configuration of a friction stir spot welding device according to Embodiment 1. In FIG. 1, an upper side and a lower side in FIG. 1 show upper side and a lower side of the friction stir spot welding device.

As shown in FIG. 1, a friction stir spot welding device 50 according to Embodiment 1 includes a pin member 11, a shoulder member 12, a tool fixing unit 52, a tool driving unit 53, a clamp member 54, a backing support section 55, a backing member 56, and a rotation driving unit 57.

The pin member 11 and the shoulder member 12 are supported by the tool fixing unit 52. The pin member 11 and the shoulder member 12 are vertically advanced and retracted by the tool driving unit 53. The pin member 11, the shoulder member 12, the tool fixing unit 52, the tool driving unit 53, and the clamp member 54 are disposed at the upper portion of the backing support section 55 configured by a C-type gun (C-type frame). The backing member 56 is provided at the lower portion of the backing support section 55. The pin member 11, the shoulder member 12, and the backing member 56 are mounted on the backing support section 55 in such a manner that the pin member 11 and the shoulder member 12 face the backing member 56. Between the pin member 11 and the shoulder member 12, and the backing member 56, an object 60 to be welded (materials to be welded) is disposed.

The tool fixing unit 52 includes a rotating tool fixing unit 521 and a clamp fixing unit 522. The tool driving unit 53 includes a pin driving unit 531, a shoulder driving unit 532, and a clamp driving unit 41. The clamp member 54 is fastened to the clamp fixing unit 522 via the clamp driving unit 41. The clamp driving unit 41 is constituted by a spring.

The pin member 11 has a substantially tubular shape with a circular cross-section or a substantially solid cylinder shape. The pin member 11 is supported by the rotating tool fixing unit 521, although not shown in detail in FIG. 1. The rotation driving unit 57 causes the pin member 11 to be rotatable around an axis Xr (rotational axis) conforming to the center axis of the pin member 11. The pin driving unit 531 causes the pin member 11 to be advanceable and retractable along an arrow P1 direction, namely the axis Xr direction (in a vertical direction in FIG. 1).

The shoulder member 12 has a tubular shape with a circular cross-section and has a hollow space. The shoulder member 12 is supported by the rotating tool fixing unit 521. The pin member 11 is inserted into the hollow space of the shoulder member 12. In other words, the shoulder member 12 is disposed to surround the outer peripheral surface of the pin member 11. The rotation driving unit 57 causes the shoulder member 12 to be rotatable around the axis Xr as in the pin member 11, and the shoulder driving unit 532 causes the shoulder member 12 to be advanceable and retractable along an arrow P2 direction, namely the axis Xr direction.

As described above, in the present embodiment, the pin member 11 and the shoulder member 12 are supported by the rotating tool fixing unit 521. The rotation driving unit 57 causes the pin member 11 and the shoulder member 12 to be rotatable together around the axis Xr. The pin driving unit 531 causes the pin member 11 to be advaceable and retractable along the axis Xr direction, and the shoulder driving unit 532 causes the shoulder member 12 to be advanceable and retractable along the axis Xr direction. In Embodiment 1, the pin member 11 is advanceable and retractable by itself, and advanceable and retractable according to the advancing and retracting motions of the shoulder member 12. Alternatively, each of the pin member 11 and the shoulder member 12 may be independently advanceable and retractable.

As in the shoulder member 12, the clamp member 54 has a tubular shape with a circular cross-section and with a hollow space, and is disposed in such a manner that its center axis conforms to the axis Xr. The shoulder member 12 is inserted into the hollow space of the clamp member 54.

More specifically, the shoulder member 12 with a substantially tubular shape with a circular cross-section is disposed to surround the outer peripheral surface of the pin member 11, and the clamp member 54 with a substantially tubular shape with a circular cross-section is disposed to surround the outer peripheral surface of the shoulder member 12. In other words, the clamp member 54, the shoulder member 12, and the pin member 11 has a concentrically nested structure.

The clamp member 54 is configured to press (push) the object 60 from a first surface (obverse surface). As described above, in Embodiment 1, the clamp member 54 is supported on the clamp fixing unit 522 via the clamp driving unit 41. The clamp driving unit 41 is configured to bias the clamp member 54 toward the backing member 56.

Although the clamp driving unit 41 is constituted by the spring in Embodiment 1, this is merely exemplary. It is sufficient that the clamp driving unit 41 applies a biasing force or a welding pressure to the clamp member 54. For example, a mechanism using a gas pressure, a hydraulic pressure, a servo motor, or the like, may be used as the clamp driving unit 41.

The rotating tool fixing unit 521 is supported on the clamp fixing unit 522 via the rotation driving unit 57. The shoulder driving unit 532 causes the clamp member 54 (including the clamp driving unit 41 and the clamp fixing unit 522) to be advanceable and retractable in arrow P3 direction (the same directions as those of arrow P1 direction and arrow P2 direction).

In summary, in Embodiment 1, the clamp driving unit 41 and the shoulder driving unit 532 constitute a clamp member driving unit. The clamp member driving unit may be constituted by a driving unit which causes the clamp member 54 to be advanceable and retractable independently of (irrelevantly) the shoulder driving unit 532.

The pin member 11, the shoulder member 12, and the clamp member 54 have a tip end portion 11*a*, a tip end portion 12*a*, and a tip end portion 54*a*, respectively. The pin member 11, the shoulder member 12, and the clamp member 54 are driven (actuated) to be advanced and retracted by the tool driving unit 53 and thereby the tip end portion 11*a*, the tip end portion 12*a*, and the tip end portion 54*a* contact the obverse surface of the object 60.

In Embodiment 1, the backing member 56 supports the object 60 with a flat shape in such a manner that a flat surface (support surface 56*a*) contacts the reverse surface of the flat object 60. The configuration of the backing member 56 is not particularly limited so long as it is capable of properly supporting the object 60 while the friction stir spot welding is performed. As the backing member 56, for example, plural kinds of backing members 56 are prepared in advance. Depending on the kind of the object 60, the backing member 56 is detached from the backing support section 55 and replaced by another backing member.

The configurations of the pin member 11, the shoulder member 12, the tool fixing unit 52, the tool driving unit 53, the clamp member 54, the backing support section 55, and the rotation driving unit 57 in Embodiment 1 are not limited to the above-described configurations. Configurations which are widely known in the art of the friction stir spot welding are suitably used. For example, although each of the pin driving unit 531 and the shoulder driving unit 532 included in the tool driving unit 53 includes the motor, the gear mechanism or the like known in the art of the friction stir spot welding, this is merely exemplary.

Although in Embodiment 1, the clamp member 54 is provided, this is merely exemplary and the clamp member 54 may be omitted. In this case, for example, the clamp member 54 may be detachable from the backing support section 55 as required.

Although in Embodiment 1, the backing support section 55 is the C-type gun, this is merely exemplary. The backing support section 55 may be configured in any way so long as the backing support section 55 can support the pin member 11 and the shoulder member 12 in such a manner that the pin member 11 and the shoulder member 12 are advanceable and retractable, and can support the backing member 56 at a location at which the backing member 56 faces the pin member 11 and the shoulder member 12.

Further, the friction stir spot welding device 50 according to Embodiment 1 is used with a robot device (not shown) for friction stir spot welding. Specifically, the backing support section 55 is attached on the tip end of an arm of the robot device. Therefore, the backing support section 55 can be recognized as being included in the robot device for friction stir spot welding. The specific configuration of the robot device for friction stir spot welding, including the backing support section 55 and the arm is not particularly limited. A configuration which is known in the art of the friction stir spot welding such as a multi-joint (articulated) robot may be used.

The friction stir spot welding device 50 (including the backing support section 55) may be suitably applied to, for example, known processing machines such as a NC machine tool, a huge C-frame, and an automatic riveting machine, as well as the robot device for friction stir spot welding.

The friction stir spot welding device 50 according to Embodiment 1 may be configured in such a manner that two or more robots cause the constituents of the friction stir spot welding device 50 which are other than the backing member 56 face the backing member 56. Further, the friction stir spot welding device 50 may hold the object 60 with the hand so long as the friction stir spot welding device 50 can stably perform the friction stir spot welding for the object 60. Or, the robot may be used as a positioner for the object 60.

[Control Configuration of Friction Stir Spot Welding Device]

Next, the control configuration of the friction stir spot welding device 50 according to Embodiment 1 will be specifically described with reference to FIG. 2.

Figure 2:
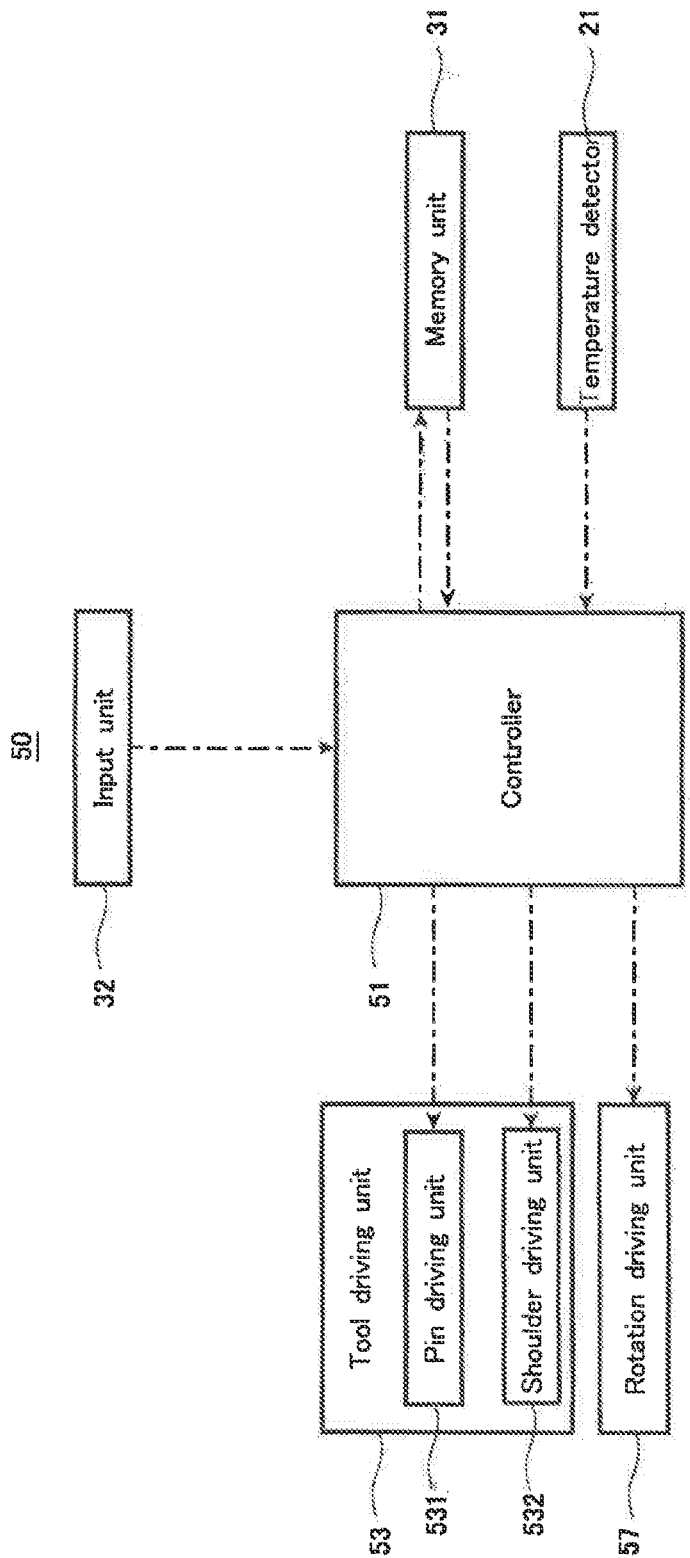
FIG. 2 is a schematic block diagram showing a control configuration of the friction stir spot welding device of FIG. 1.

FIG. 2 is a schematic block diagram showing the control configuration of the friction stir spot welding device of FIG. 1.

As shown in FIG. 2, the friction stir spot welding device 50 includes a controller 51, a temperature detector 21, a memory unit 31, and an input unit 32.

The memory unit 31 is configured to store therein data so that the data can be read therefrom. As the memory unit 31, a memory device such as a known memory and a hard disc is used. The memory unit 31 is not necessarily a single memory unit and may be comprised of a plurality of memories (e.g., a random access memory and a hard disc drive). In a case where the controller 51 or the like is configured as a microcomputer, at least a portion of the memory unit 31 may be configured as an internal memory of the microcomputer or an independent memory.

Not to mention, data is stored in the memory unit 31 and can be read by the constituent other than the controller 51, or the controller 51 or the like can write the data to the memory unit 31.

Reference temperatures and plunging forces applied by the tool (the pin member 11 and the shoulder member 12) at the reference temperatures, and a calculation formula for adjusting the plunging forces which will be described later are stored in the memory unit 31. Specifically, for example, a first reference temperature T1 which is an arbitrary temperature of the pin member 11 in a range of 20 to 80 degrees C., a plunging force F1 (e.g., arbitrary value included in a range of 3000N~8000N) applied by the tool at the first reference temperature T1, a second reference temperature T2 (e.g., arbitrary temperature in a range of 140 to 160 degrees C.) set as a temperature higher than the first reference temperature T1, and a plunging force F2 (e.g., arbitrary value included in a range of 500N~2 000N) applied by the tool at the second reference temperature T2, are stored in the memory unit 31.

The first reference temperature T1, the second reference temperature T2, the plunging force F1, and the plunging force F2 can be found in advance by, for example, experiment. For example, the first reference temperature T1 may be an average value of the temperature of the pin member 11 after the object 60 is welded in a state in which the pin member 11 and/or the shoulder member 12 is/are sufficiently cooled. The second reference temperature T2 may be the temperature of the pin member 11 at a time point (e.g., 10-th spotting point in the graph of FIG. 4) when a temperature increase of the pin member 11 is reduced, in a case where the serial spots welding is performed for the object 60.

The plunging force F1 may be suitably set depending on the material of the object 60, or the like. The plunging force F2 may be a plunging force at a time point when defectives of the external appearance or the like in the welded region of the 10-th spotting point does not occur in a case where the serial spots welding (e.g., welding of 10 spotting points) is performed for the object 60 with a predetermined plunging force.

The input unit 32 is operated to input to the controller 51 the parameters relating to a control for the friction stir spot welding, other data, a command directing start of the friction stir spot welding, or the like. The input unit 32 is configured as a known input device such as a key board, a touch panel, a button switch, or the like. In Embodiment 1, at least data of welding conditions of the object 60, for example, the thickness of the object 60 and quality of the material of the object 60 can be input by use of the input unit 32.

The temperature detector 21 is configured to detect the temperature of the tool and output the detected temperature to the controller 51. Specifically, in Embodiment 1, the temperature detector 21 is configured to detect the temperature of the tip end portion 11a of the pin member 11 and output the detected temperature to the controller 51. As the temperature detector 21, a variety of known temperature sensors may be used. For example, a radiation thermometer, a thermography, a thermocouple, etc., may be used.

Although in Embodiment 1, the temperature detector 21 directly detects the temperature of the tip end portion 11a of the pin member 11, it may indirectly detect the temperature of the tip end portion 11a of the pin member 11. For example, the temperature detector 21 may be configured to detect the temperature of the tip end portion 12a of the shoulder member 12 or the temperature of the tip end portion 54a of the clamp member 54.

In a case where the thermocouple is used as the temperature detector 21, the temperature detector 21 may be attached on the outer peripheral surface of a portion of the shoulder member 12 which is in the vicinity of the tip end portion 12a, or may be attached on the outer peripheral surface of a portion of the clamp member 54 which is in the vicinity of the tip end portion 54a.

The controller 51 is configured to control the members (units) included in the friction stir spot welding device 50. Specifically, the controller 51 controls the pin driving unit 531 and the shoulder driving unit 532 included in the tool driving unit 53, and the rotation driving unit 57.

Thus, the controller 51 can control shifting between an advancing motion and a retracting motion of each of the pin member 11 and the shoulder member 12, and the tip end position, moving speed, a moving direction and the like of each of the pin member 11 and the shoulder member 12 during the advancing motion and the retracting motion.

In addition, the controller 51 can control the plunging force applied by the tool to press the object 60, the rotational speed of the tool, and the actuation time of the tool. As the temperature of the tip end portion 11a of the pin member 11 which is detected by the temperature detector 21 is higher, the controller 51 reduces the plunging force applied by the tool to press the object 60 so that this plunging force is less than the plunging force at the reference temperature.

The specific configuration of the controller 51 is not particularly limited. In Embodiment 1, the controller 51 is constituted by a CPU of a microcomputer. The controller 51 is configured to perform computations relating to the operation of the tool driving unit 53 and the operation of the rotation driving unit 57 in such a manner that the CPU reads specified control programs stored in the memory unit 31 and executes the control programs. Note that the controller 51 may be a single controller, or a controller group including a plurality of controllers which perform a cooperative control for the friction stir spot welding device 50.

Further, the controller 51 is configured to set (calculate) the plunging force applied by the tool to press the object 60 based on the temperature data detected by the temperature detector 21 when the welding of the object 60 starts, and the first reference temperature T1, the second reference temperature T2, the plunging force F1 applied by the tool at the first reference temperature T1, the plunging force F2 applied by the tool at the second reference temperature T2, and the calculation formula used to adjust the plunging force, which are stored in the memory unit 31.

Specifically, in a case where the temperature of the tip end portion 11a of the pin member 11 which is detected by the temperature detector 21 is designated by Tn, the controller 51 sets a plunging force Fn applied by the tool to press the object 60 at the temperature Tn according to the following formula (1):

$$Fn=F1-(Tn-T1)/(T2-T1)\times F2 \qquad (1)$$

The phrase "when the welding of the object 60 starts" may be a desired timing within a period from when a command directing start of the welding of the object 60 is input to the controller 51 by use of the input unit 32 until the pin member 11, the shoulder member 12, and the clamp member 54 contact the object 60. Also, "when the welding of the object 60 starts" may be a desired timing within a period from when the pin member 11, the shoulder member 12, and the clamp member 54 have moved to a specified position at which the object 60 is welded until the pin member 11, the shoulder member 12, and the clamp member 54 contact the object 60.

Although Embodiment 1, the temperature detector 21 detects the temperature of the pin member 11 when the welding of the object 60 starts, the present invention is not limited to this. For example, the temperature detector 21 may detect the temperature of the pin member 11 at an arbitrary timing within a period from the end of the welding step for the object 60 (the pin member 11, the shoulder member 12, and the clamp member 54 move away from the object 60) until the start of the next welding step for the object 60 (the pin member 11, the shoulder member 12, and the clamp member 54 contact the object at next time).

Although in Embodiment 1, the calculation formula (formula (1)) used to adjust the plunging force is a linear function, the present invention is not limited to this and the calculation formula (1) may be a high-dimensional function, an exponential function, or a logarithmic function.

Although the controller 51 controls the tool driving unit 53 and the rotation driving unit 57 to actuate the pin member 11 and the shoulder member 12 while pressing the object 60 with the set plunging force Fn by the tool. Specifically, the controller 51 controls the tool driving unit 53 and the rotational driving unit 57 so that the absolute value of a tool average position Tx defined in the formula (2) is reduced, in a case where the cross-sectional area of the tip end portion of the pin member 11 is designated by Ap, the cross-sectional area of the tip end portion of the shoulder member 12 is designated by As, the plunge depth of the pin member 11 is designated by Pp, and the plunge depth of the shoulder member 12 is designated by Ps, $$Ap\cdot Pp+As\cdot Ps=Tx \qquad (2)$$

[Friction Stir Spot Welding Method (Operation of Friction Stir Spot Welding Device]

Next, specific steps of the friction stir spot welding method performed by use of the friction stir spot welding device 50 will be specifically described with reference to FIGS. 3A and 3B. In the example shown in FIGS. 3A and 3B, two metal plates 61, 62 are used as the object 60, lapped and joined to each other by a spot welding.

Figure 3A:
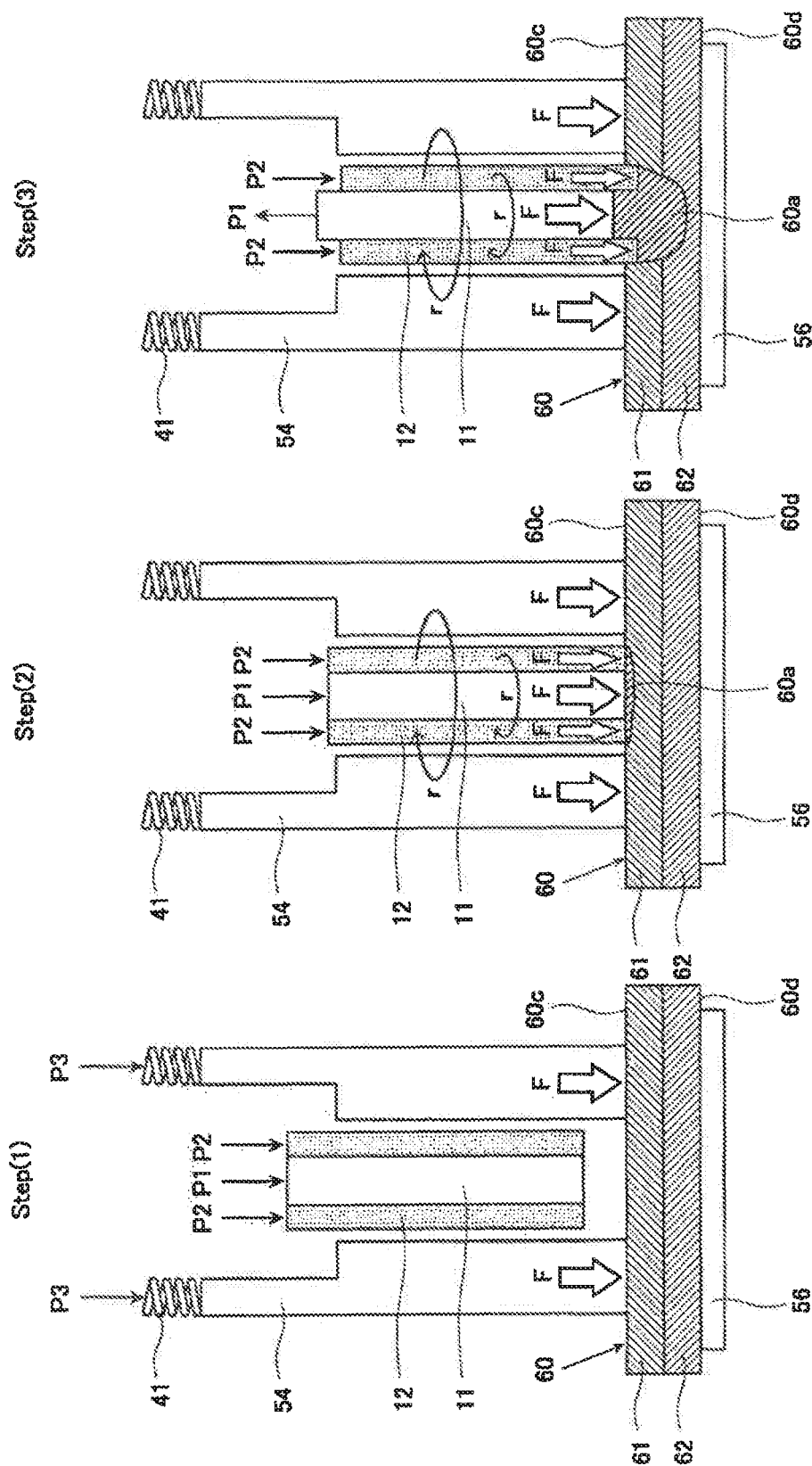
FIG. 3A is a schematic view showing an example of steps of friction stir spot welding performed by the friction stir spot welding device of FIG. 1.
Figure 3B:
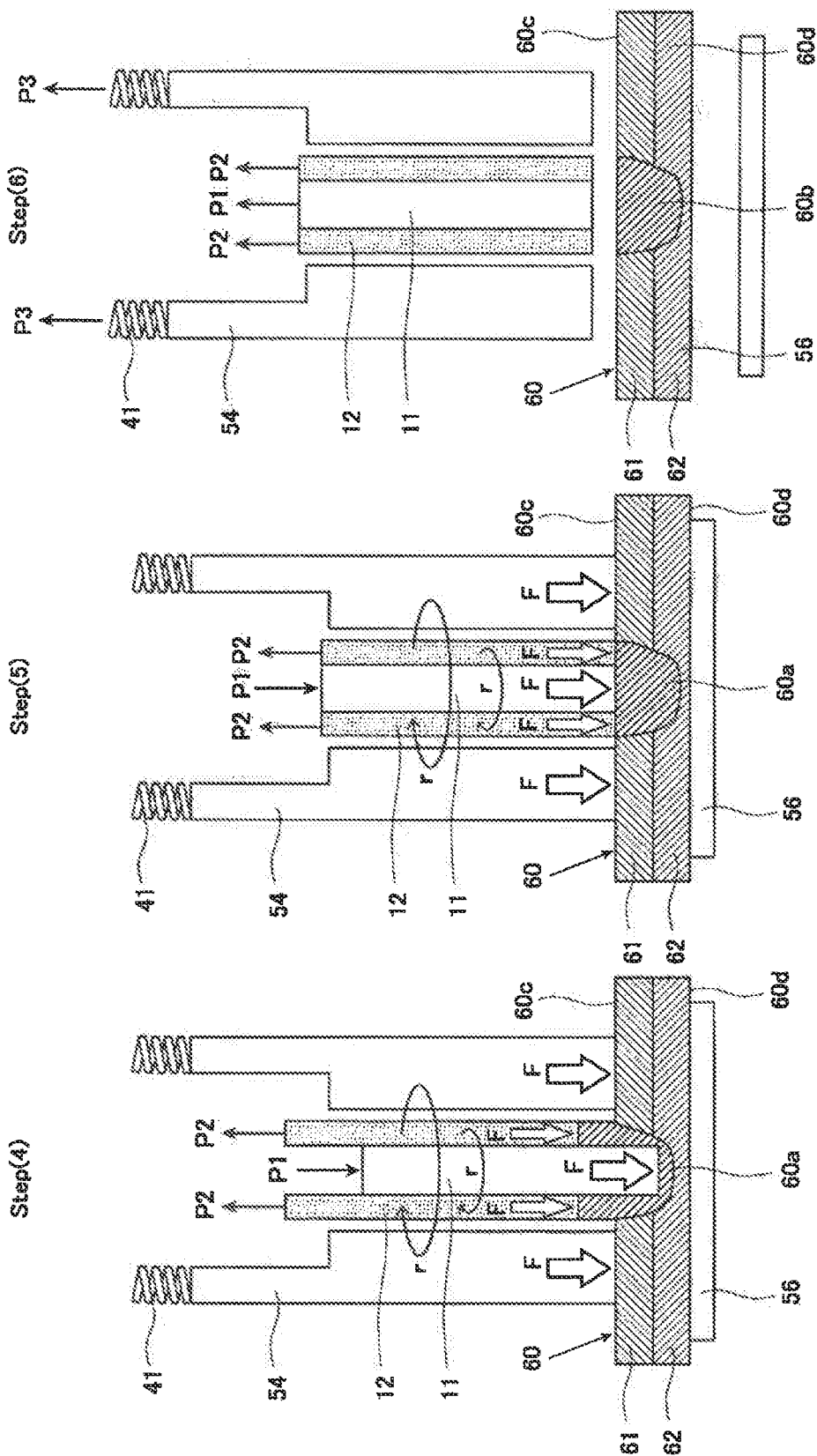
FIG. 3B is a schematic view showing an example of steps of the friction stir spot welding performed by the friction stir spot welding device of FIG. 1.

FIGS. 3A and 3B are schematic views showing an example of steps of the friction stir spot welding performed by the friction stir spot welding device of FIG. 1. In the example of FIGS. 3A and 3B, a part of the friction stir spot welding device is not shown, arrows r indicate the rotational direction of the pin member 11 and the rotational direction of the shoulder member 12, respectively, and block arrows F indicate directions, respectively, of forces applied to the metal plates 61, 62.

Although the forces are applied to the metal plates 61, 62 by the backing member 56, this is not shown in FIGS. 3A and 3B, for easier understanding of the description. The shoulder member 12 is hatched to be distinguished from the pin member 11 and the clamp member 54.

Hereinafter, an example of the welding operation of the single spot welding, which is performed by the friction stir spot welding device 50, will be described.

Initially, the object 60 is placed on the upper surface of the backing member 56. Then, the controller 51 drives the tool driving unit 53 to cause the clamp member 54 to approach the object 60 (the metal plates 61, 62), and to bring the tip end portion 54a of the clamp member 54 (the end portion 54a is not shown in FIGS. 3A and 3B) into contact with the obverse surface 60c of the object 60 (see step (1) of FIG. 3A).

Thus, the metal plates 61, 62 are retained between the clamp member 54 and the backing member 56, and the clamp driving unit 41 shrinks to bias the clamp member 54 toward the obverse surface 60c of the object 60, thereby generating a clamping force.

Then, the controller 51 drives the rotational driving unit 57 to rotate the pin member 11 and the shoulder member 12. In this state, the controller 51 drives the tool driving unit 53 to cause the pin member 11 and the shoulder member 12 to approach the object 60 and contact the obverse surface 60c of the object 60 while rotating the tip end portion 11a of the pin member 11 and the tip end portion 12a of the shoulder member 12.

At this time, the controller 51 controls the tool driving unit 53 so that the pin member 11, the shoulder member 12, and the clamp member 54 press (push) the object 60 with a preset plunging force (e.g., predetermined value in a range of 3000N to 8000N).

In this state, the pin member 11 and the shoulder member 12 do not perform the advancing motion and the retracting motion. Therefore, the obverse surface 60c of the object 60 is preliminarily heated. By this preliminary heating, the metal material of a region of the metal plate 61 which is in contact with the pin member 11 and the shoulder member 12 generates heat by a friction and is softened, and a plasticized (plastic flow) region 60a is generated in a region which is in the vicinity of the obverse surface 60c of the object 60.

Then, the controller 51 controls the pin driving unit 531 and/or the shoulder driving unit 532 (see FIG. 1) to cause the pin member 11 to be retracted from the obverse surface 60c of the object 60, and thereby causes the shoulder member 12 to be advanced (plunged) into the object 60 from the obverse surface 60c (see step (3) of FIG. 3A). At this time, a portion of the upper metal plate 61 and a portion of the lower metal plate 62 are softened, and thus the quantity of the plasticized region 60a is increased.

Then, the controller 51 controls the pin driving unit 531 to cause the retracted pin member 11 to be gradually advanced (plunged) into the metal plate 61. According to this advancing motion, the shoulder member 12 is retracted from the metal plate 61 (see step (4) of FIG. 3B). Note that step (4) may not be performed if the obverse surface 60c of the metal plate 61 is sufficiently shaped in step (5) which will be described later.

In a case where the controller 51 performs step (3) and step (4), the controller 51 controls the tool driving unit 53 so that the absolute value of the tool average position Tx is reduced (made small) as described above. A specific control for reducing the absolute value of the tool average position Tx is disclosed in Patent Literature 1 in detail, and will not be described herein.

The controller 51 preferably controls the tool driving unit 53 to realize the tool average position Tx=0 (the tool average position Tx is equal to 0). "The tool average position Tx=0" refers to a state in which the tool average position Tx is ±0 (Tx 0). In this state, it may be assumed that Tx is equal to 0, based on the unit, significant digits, and other conditions of the cross-sectional area Ap of the pin member 11, the cross-sectional area As of the shoulder member 12, the plunge depth Pp of the pin member 11, and the plunge depth Ps of the shoulder member 12. Thus, depending on the various conditions such as the configuration and uses of the friction stir spot welding device 50, the tool average position Tx need not be reduced to 0, and the absolute value of the tool average position Tx may be set to a smallest possible value in practice so long as a favorable control is realized.

In a case where the controller 51 moves from step (3) to step (5), the controller 51 controls the pin driving unit 531 to cause the pin member 11 to be gradually advanced. In contrast, in a case where the controller 51 moves from step (3) to step (5) through step (4), the controller 51 controls the pin driving unit 531 to cause the pin member 11 to be gradually retracted. During the retracting motion of the pin member 11 or the shoulder member 12, the welding pressure applied by the tip end portion of the pin member 11 or the tip end portion of the shoulder member 12 is maintained (see arrows F of step (3) of FIG. 3A and arrows F of step (4) of FIG. 3B).

In a case where the shoulder member 12 is retracted, the rotation and plunging operations of the pin member 11 are maintained. Therefore, the softened metal material of the plasticized region 60a moves from a region that is immediately below the pin member 11 to a region that is immediately below the shoulder member 12, so that underfill generated by the plunge of the shoulder member 12 into the material is backfilled.

In contrast, in a case where the pin member 11 is retracted, the rotation and plunging operations of the shoulder member 12 are maintained. Therefore, the softened metal material of the plasticized region 60a moves from a region that is immediately below the shoulder member 12 to a region that is immediately below the pin member 11, so that underfill generated by the plunge of the pin member 11 into the material is backfilled.

Then, the controller 51 controls the tool driving unit 53 so that the tip end portion 11a of the pin member 11 and the tip end portion 12a of the shoulder member 12 become coplanar with each other without a level difference between them (see step (5) of FIG. 3B). In this way, the obverse surface 60c of the object 60 is shaped, and a substantially flat surface without substantial underfill can be obtained.

Then, the controller 51 controls the tool driving unit 53 to cause the pin member 11, the shoulder member 12, and the clamp member 54 to move away from the object 60. Then, the controller 51 controls the rotation driving unit 57 to stop the rotation of the pin member 11 and the rotation of the shoulder member 12. In this way, a series of friction stir spot welding steps (welding steps for the object 60) are terminated (see step (6) of FIG. 3B). In this state, the rotational force (and plunging force) which are applied by the pin member 11 and the shoulder member 12 due to the contact with the object 60 are not exerted on the metal plates 61, 62. Therefore, a plasticization (plastic flow) of the plasticized region 60a of the metal plates 61, 62 is ceased, and the plasticized region 60a becomes a welded region 60b. In this way, the two metal plates 61, 62 are joined (welded) to each other by the welded region 60b.

[Serial Spots Welding Operation of Friction Stir Spot Welding Device]

Hereinafter, the operation (control method) in a case where the serial spots welding is performed by the friction stir spot welding device 50 according to Embodiment 1 will be described.

Figure 4:
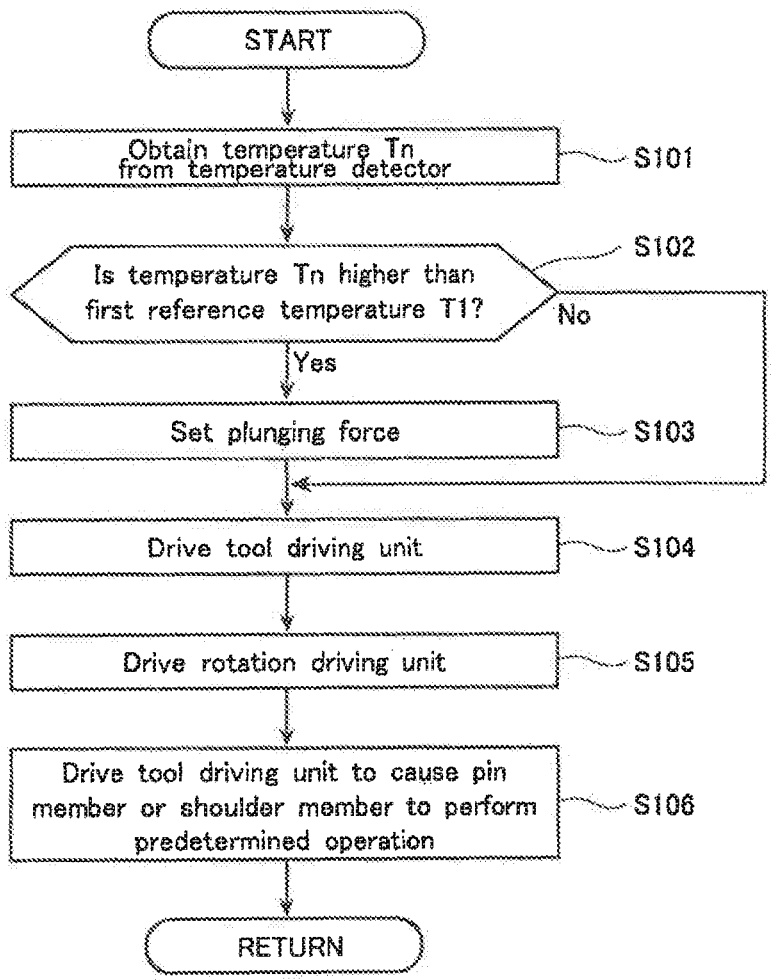
FIG. 4 is a flowchart showing the exemplary operation of the friction stir spot welding device according to Embodiment 1 in a case where serial spots welding is performed.

FIG. 4 is a flowchart showing the exemplary operation of the friction stir spot welding device according to Embodiment 1 in a case where the serial spots welding is performed.

As shown in FIG. 4, initially, the command directing start of the welding of the object 60 is input to the controller 51 by use of the input unit 32, or the pin member 11, the shoulder member 12, and the clamp member 54 move to predetermined positions at which the object 60 is welded (Start). The controller 51 obtains the temperature Tn of the pin member 11 which is detected by the temperature detector 21 (step S101). Then, the controller 51 determines whether or not the temperature Tn obtained in step S101 is higher than the first reference temperature T1 stored in the memory unit 31 (step S102).

In a case where the controller 51 determines that the temperature Tn obtained in step S101 is higher than the first reference temperature T1 (Yes in step S102), the controller 51 sets the plunging force applied by the tool to press the object 60 (step S103). Specifically, as described above, the controller 51 assigns the temperature Tn obtained in step S101 to the formula (1) to set the plunging force, and moves to step S104. On the other hand, in a case where the controller 51 determines that the temperature Tn obtained in step S101 is equal to or lower than the first reference temperature T1 (No in step S102), the controller 51 does not set the plunging force, and moves to step S104.

In step S104, the controller 51 drives the tool driving unit 53 to cause the pin member 11, the shoulder member 12, and the clamp member 54 to move and approach the object 60 (the metal plates 61, 62).

In a case where the controller 51 sets the plunging force in step S103, the controller 51 drives the tool driving unit 53 to cause the tool to press the object 60 with the set plunging force. On the other hand, in a case where the controller 51 does not set the plunging force in step S103 (namely, a case where the temperature Tn is equal to or lower than the first reference temperature T1), the controller 51 drives the tool driving unit 53 to cause the tool to press the object 60 with the plunging force F1 at the first reference temperature T1.

This makes it possible to prevent the metal material from being excessively softened and the softened material from moving toward the clamp member 54.

Then, the controller 51 drives the rotational driving unit 57 to cause the pin member 11 and the shoulder member 12 to rotate at a preset (predetermined) rotational speed (step S105). This causes the pin member 11, the shoulder member 12 and the clamp member 54 to move and approach the object 60 while the pin member 11 and the shoulder member 12 are rotating.

Although in Embodiment 1, the controller 51 drives the rotation driving unit 57 after it drives the tool driving unit 53, this is merely exemplary. For example, the controller 51 may drive the tool driving unit 53 after it drives the rotation driving unit 57. Further, for example, the controller 51 may drive the tool driving unit 53 to cause the pin member 11, the shoulder member 12, and the clamp member 54 to contact the object 60, and then drive the rotation driving unit 57.

Then, after the pin member 11, the shoulder member 12, and the clamp member 54 have contacted the object 60, the controller 51 controls the tool driving unit 53 to cause the pin member 11 or the shoulder member 12 to perform a predetermined operation (step S106). Specifically, the controller 51 controls the tool driving unit 53 according to a predetermined control program. At this time, the controller 51 preferably controls the tool driving unit 53 so that the absolute value of the tool average position Tx is reduced. More preferably, the controller 51 controls the tool driving unit 53 to realize the tool average position Tx=0.

When the welding step for the object 60 ends, the controller 51 controls the tool driving unit 53 to cause the pin member 11, the shoulder member 12, and the clamp member 54 to move away from the object 60, returns to the start of the present flow, and initiates the next welding step.

Example 1

Next, Example in a case where the serial spots welding is performed for the object 60 by use of the friction stir spot welding device 50 according to Embodiment 1 will be described with reference FIG. 6.

In the present example, as in the serial spots welding test of FIG. 5, 40 spots were serially welded, under a condition in which two aluminum alloy materials A7075C-T6 (plate thickness was 1.27 mm) were lapped and wait time that passes from the end of welding of a certain welding spot to the start of welding of a next welding spot was set to 1 second. In the serial spots welding test of Example 1, the plunging force applied by the pin member 11 and the plunging force applied by the shoulder member 12 to press the object 60 were reduced based on the temperature detected by the temperature detector 21.

Figure 6:
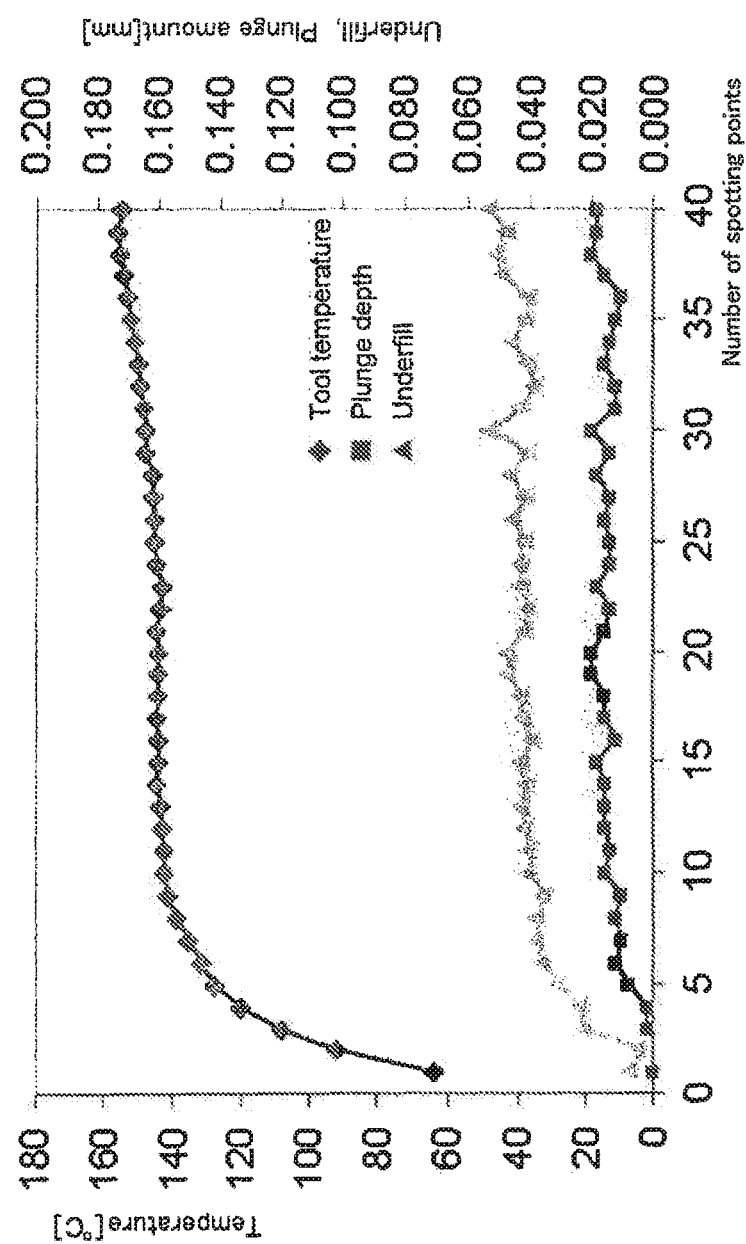
FIG. 6 is a graph showing a relationship among the tool temperature, and the plunge depth of the shoulder member and the underfill of the welded region, in a case where the serial spots welding test is performed under a condition in which the plunging force is changed.

As can be seen from FIG. 6, even in a case where the tool temperature increased, an increase in the plunge depth of the tool and an increase in the underfill of the welded region from the obverse surface of the object 60 were suppressed more than in the result of the serial spots welding test of FIG. 5.

In the friction stir spot welding device 50 according to Embodiment 1, by setting the plunging force applied by the pin member 11 and the plunging force applied by the shoulder member 12 to press the object 60 based on the temperature of the tip end portion 12a of the pin member 11, in a case where the serial spots welding is performed. This makes it possible to secure a good external appearance quality or the like of the welded regions of the object 60 and realize a good welding quality.

Embodiment 2

A friction stir spot welding device according to Embodiment 2, which welds an object to be welded, by softening the object by friction heat and by stirring the object, comprises a tool with a cylindrical shape, the tool being rotatable around an axis thereof, advanceable along a direction of the axis, and retractable along the direction of the axis; a temperature detector which detects a temperature of the tool; and a controller configured to, in a case where serial spots welding is performed for the object, compare the temperature of the tool which is detected by the temperature detector in a period which passes from end of a welding step for the object until start of a next welding step for the object, to a predetermined reference temperature, to set a rotational speed of the tool in the next welding step. The configuration of the friction stir spot welding device according to Embodiment 2 is similar to that of the friction stir spot welding device according to Embodiment 1 and will not be described in repetition.

Hereinafter, the operation (control method) in a case where the serial spots welding is performed by the friction stir spot welding device 50 according to Embodiment 2 will be described.

[Serial Spots Welding Operation of Friction Stir Spot Welding Device]

Figure 7:
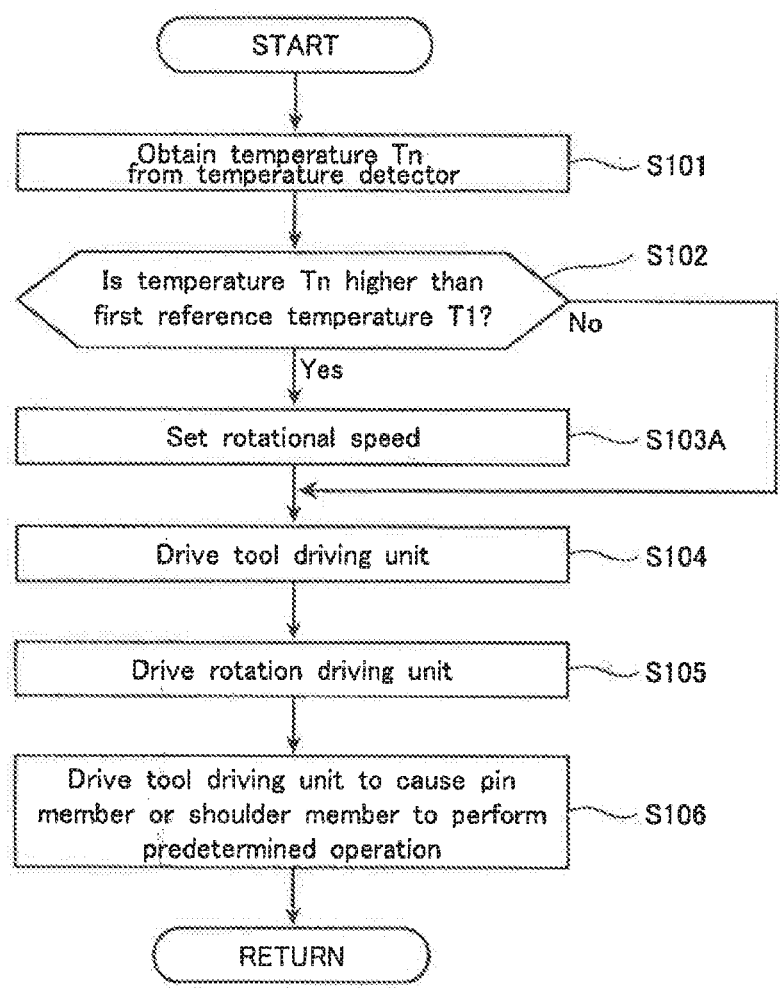
FIG. 7 is a flowchart showing the exemplary operation of a friction stir spot welding device according to Embodiment 2 in a case where the serial spots welding is performed.

FIG. 7 is a flowchart showing the exemplary operation of the friction stir spot welding device according to Embodiment 2 in a case where the serial spots welding is performed.

As shown in FIG. 7, the serial spots welding operation performed by the friction stir spot welding device 50 according to Embodiment 2 is basically the same as that of the friction stir spot welding device 50 according to Embodiment 1 except that step S103A is performed instead of step S103, in the serial spots welding operation performed by the friction stir spot welding device 50 according to Embodiment 2.

Specifically, in a case where the controller 51 determines that the temperature Tn obtained in step S101 is higher than the first reference temperature T1 (Yes in step S102), the controller 51 sets the rotational speed of the tool (step S103A), and moves to step S104. At this time, the controller 51 may set the rotational speed of the tool which is lower than the rotational speed of the tool at the first reference temperature T1. In addition, the controller 51 may reduce the rotational speed of the tool in proportion to a temperature increase of the pin member 11.

On the other hand, in a case where the controller 51 determines that the temperature Tn obtained in step S101 is equal to or lower than the first reference temperature T1 (No in step S102), the controller 51 does not set the rotational speed of the tool, and moves to step S104.

Then, in step S105, the controller 51 drives the rotation driving unit 57 to cause the tool to rotate at the set rotational speed, in a case where the controller 51 sets the rotational speed in step S103A. On the other hand, in a case where the controller 51 does not set the rotational speed in step S103A (namely, the temperature Tn is equal to or lower than the first reference temperature T1), the controller 51 drives the rotation driving unit 57 to cause the tool to rotate at the rotational speed at the first reference temperature T1, in step S105.

This makes it possible to prevent the metal material from being excessively softened and the softened material from moving toward the clamp member 54.

The friction stir spot welding device 50 according to Embodiment 2 configured as described above can obtain advantages similar to those of the friction stir spot welding device 50 according to Embodiment 1.

Embodiment 3

In a friction stir spot welding device according to Embodiment 3, the controller compares the temperature of the tool which is detected by the temperature detector to the reference temperature to set the plunging force applied by the tool to press the object and the rotational speed of the tool. The configuration of the friction stir spot welding device according to Embodiment 3 is similar to that of the friction stir spot welding device according to Embodiment 1, and will not be described in repetition.

Hereinafter, the operation (control method) in a case where the serial spots welding is performed by the friction stir spot welding device 50 according to Embodiment 3 will be described.

[Serial Spots Welding Operation of Friction Stir Spot Welding Device]

Figure 8:
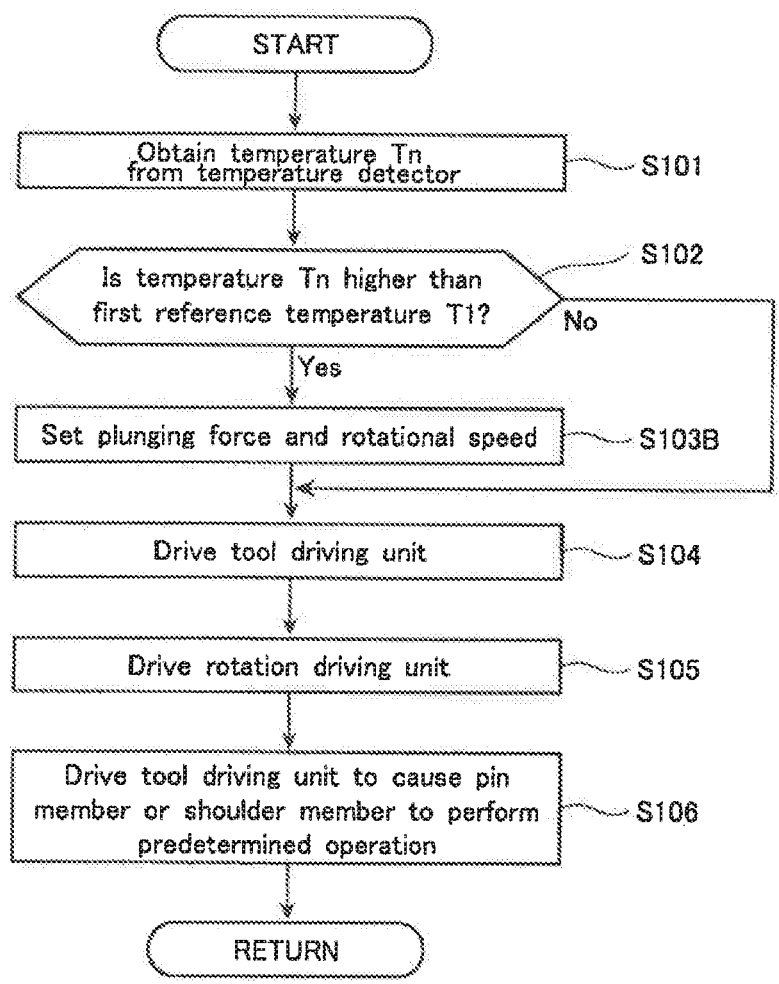
FIG. 8 is a flowchart showing the exemplary operation of a friction stir spot welding device according to Embodiment 3 in a case where the serial spots welding is performed.

FIG. 8 is a flowchart showing the exemplary operation of the friction stir spot welding device according to Embodiment 3 in a case where the serial spots welding is performed.

As shown in FIG. 8, the serial spots welding operation performed by the friction stir spot welding device 50 according to Embodiment 3 is basically the same as that of the friction stir spot welding device 50 according to Embodiment 1 except that step S103B is performed instead of step S103, in the serial spots welding operation performed by the friction stir spot welding device 50 according to Embodiment 3.

Specifically, in a case where the controller 51 determines that the temperature Tn obtained in step S101 is higher than the first reference temperature T1 (Yes in step S102), the controller 51 sets the plunging force applied by the tool to press the object 60 and the rotational speed of the tool (step S103B), and moves to step S104. At this time, the controller 51 sets the plunging force applied by the tool and the rotational speed of the tool so that the plunging force is less than the plunging force at the first reference temperature T1 and the rotational speed is lower than the rotational speed at the first reference temperature T1.

Alternatively, the controller 51 may set the plunging force applied by the tool which is greater than the plunging force of the tool which is set in Embodiment 1, so long as (provided that) the plunging force is less than the plunging force at the first reference temperature T1. Further, the controller 51 may set the rotational speed of the tool which is higher than the rotational speed of the tool which is set in Embodiment 2 so long as the rotational speed is lower than the rotational speed at the first reference temperature T1.

This makes it possible to prevent the metal material from being excessively softened and the softened material from moving toward the clamp member 54.

The friction stir spot welding device 50 according to Embodiment 3 configured as described above can obtain advantages similar to those of the friction stir spot welding device 50 according to Embodiment 1.

Embodiment 4

A friction stir spot welding device according to Embodiment 4, which welds an object to be welded, by softening the object by friction heat and by stirring the object, comprises a tool with a cylindrical shape, the tool being rotatable around an axis thereof, advanceable along a direction of the axis, and retractable along the direction of the axis; a temperature detector which detects a temperature of the tool; and a controller configured to, in a case where serial spots welding is performed for the object, compare the temperature of the tool which is detected by the temperature detector in a period which passes from end of a welding step for the object until start of a next welding step for the object, to a predetermined reference temperature, to set actuation time of the tool in the next welding step. The configuration of the friction stir spot welding device according to Embodiment 4 is similar to that of the friction stir spot welding device according to Embodiment 1 and will not be described in repetition.

Hereinafter, the operation (control method) in a case where the serial spots welding is performed by the friction stir spot welding device 50 according to Embodiment 4 will be described.

[Serial Spots Welding Operation of Friction Stir Spot Welding Device]

Figure 9:
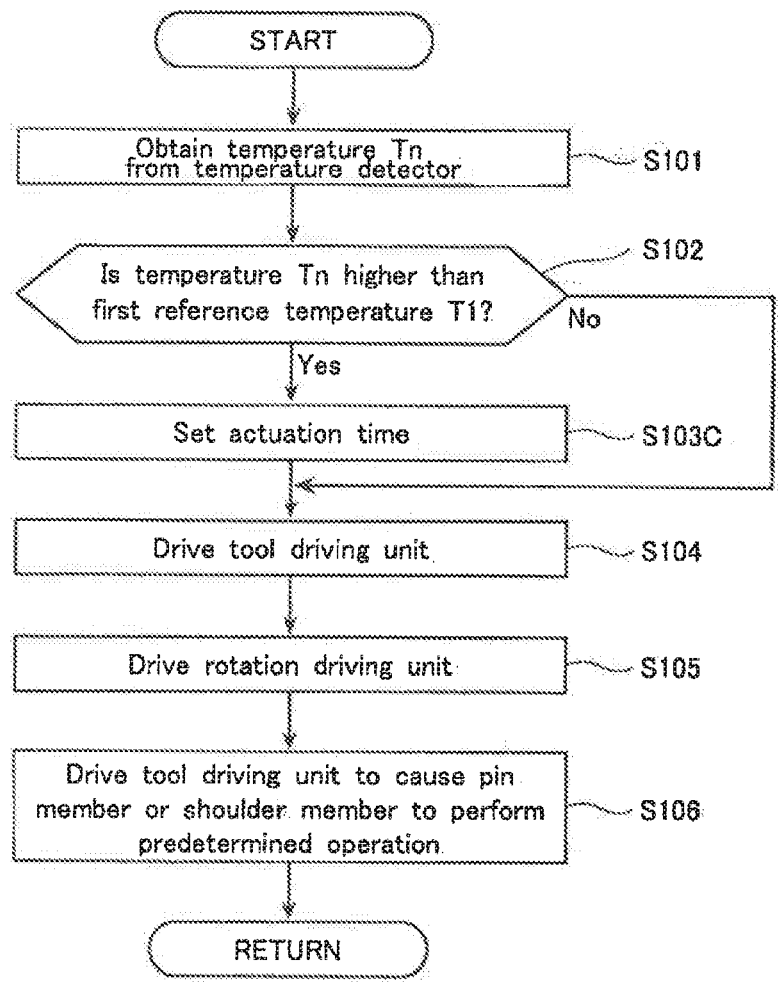
FIG. 9 is a flowchart showing the exemplary operation of a friction stir spot welding device according to Embodiment 4 in a case where the serial spots welding is performed.

FIG. 9 is a flowchart showing the exemplary operation of the friction stir spot welding device according to Embodiment 4 in a case where the serial spots welding is performed.

As shown in FIG. 9, the serial spots welding operation performed by the friction stir spot welding device 50 according to Embodiment 4 is basically the same as that of the friction stir spot welding device 50 according to Embodiment 1 except that step S103C is performed instead of step S103, in the serial spots welding operation performed by the friction stir spot welding device 50 according to Embodiment 4.

Specifically, in a case where the controller 51 determines that the temperature Tn obtained in step S101 is higher than the first reference temperature T1 (Yes in step S102), the controller 51 sets the actuation time of the tool (step S103C), and moves to step S104. At this time, the controller 51 may set the actuation time of the tool which is shorter than the actuation time of the tool at the first reference temperature T1. Further, the controller 51 may reduce the actuation time of the tool in proportion to a temperature increase of the pin member 11.

The actuation time of the tool which is set in step S103C may be time that passes from when the pin driving unit 531 and/or the shoulder driving unit 532 move(s) the tool in the thickness direction of the object 60 until the pin driving unit 531 and/or the shoulder driving unit 532 move(s) the tool away from the object 60, after the tool has been moved a predetermined position where the object 60 is welded. Alternatively, the actuation time of the tool which is set in step S103C may be time which passes from when the tool is rotated in a state in which the tool is in contact with the obverse surface 60c of the object 60 until the tool is moved away from the object 60.

Specifically, as the actuation time of the tool, the controller 51 may set the time (time for which the object 60 is preliminarily heated: step(2) of FIG. 3A) for which the tool is rotated in a state in which the tool is in contact with the obverse surface 60c of the object 60.

Alternatively, as the actuation time of the tool, the controller 51 may set the time (step (3) of FIG. 3A and/or step (4) of FIG. 3B) for which the tool is moved in the thickness direction (vertical direction in FIG. 1) of the object 60 after the preliminary heating. In this case, as the actuation time of the tool, the controller 51 may set the time for which the pin member 11 or the shoulder member 12 is moved in a direction (downward direction in FIG. 1) in which the pin member 11 or the shoulder member 12 is plunged into the object 60 from the obverse surface, or the time for which the pin member 11 or the shoulder member 12 is moved in a direction (upward direction in FIG. 1) in which the pin member 11 or the shoulder member 12 is moved away from the obverse surface of the object 60.

On the other hand, in a case where the controller 51 determines that the temperature Tn obtained in step S101 is equal to or lower than the first reference temperature T1 (No in step S102), the controller 51 does not set the actuation time of the tool, and moves to step S104.

In a case where the controller 51 sets the actuation time of the tool in step S103C, the controller 51 drives the tool driving unit 53 and/or the rotation driving unit 57 to actuate the tool for the set time, in step S105. On the other hand, in a case where the controller 51 does not set the actuation time of the tool in step S103C (a case where the temperature Tn is equal to or lower than the first reference temperature T1), the controller 51 drives the tool driving unit 53 and/or the rotation driving unit 57 to actuate the tool for the actuation time at the first reference temperature T1, in step S105.

This makes it possible to prevent the metal material from being excessively softened and the softened material from moving toward the clamp member 54.

The friction stir spot welding device 50 according to Embodiment 4 configured as described above can obtain advantages similar to those of the friction stir spot welding device 50 according to Embodiment 1.

Although in Embodiment 4, the controller 51 compares the temperature Tn to the first reference temperature to set the actuation time of the tool, this is exemplary. For example, the controller 51 may compare the temperature Tn to the first reference temperature, to set a speed at which the pin driving unit 531 and/or the shoulder driving unit 532 move(s) the tool in the thickness direction of the object 60.

Specifically, after preliminarily heating the object 60, the controller 51 sets the speed at which the tool is moved in the thickness direction (vertical direction in FIG. 1) of the object 60 (step(3) of FIG. 3A and step(4) of FIG. 3B).

More specifically, the controller 51 may set a speed at which the pin member 11 or the shoulder member 12 is moved to a predetermined position (predetermined depth) after the pin member 11 or the shoulder member 12 has been plunged into the object 60 from the obverse surface, a speed at which the pin member 11 or the shoulder member 12 is moved away from the obverse surface of the object 60 to a predetermined position (predetermined vertical level), a speed at which the pin member 11 or the shoulder member 12 located at a predetermined depth is moved to a predetermined vertical level, or a speed at which the pin member 11 or the shoulder member 12 located at a predetermined vertical level is moved to a predetermined depth.

In this case, the controller 51 may set the speed which is higher than the speed at which the tool is moved at the first reference temperature T1. Further, the controller 51 may increase the speed at which the tool is moved, in proportion to a temperature increase of the pin member 11.

Embodiment 5

In a friction stir spot welding device according to Embodiment 5, the controller compares the temperature of the tool which is detected by the temperature detector to the reference temperature to set the plunging force applied by the tool to press the object and the actuation time of the tool. The configuration of the friction stir spot welding device according to Embodiment 5 is similar to that of the friction stir spot welding device according to Embodiment 1, and will not be described in repetition.

Hereinafter, the operation (control method) in a case where the serial spots welding is performed by the friction stir spot welding device 50 according to Embodiment 5 will be described.

[Serial Spots Welding Operation of Friction Stir Spot Welding Device]

Figure 10:
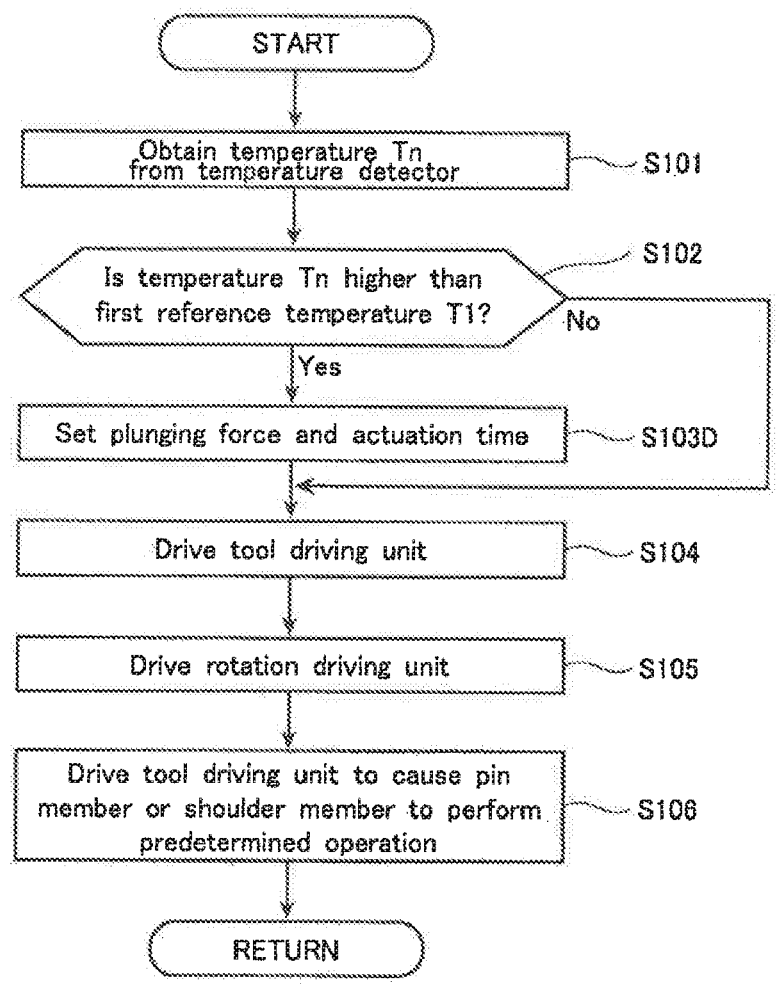
FIG. 10 is a flowchart showing the exemplary operation of a friction stir spot welding device according to Embodiment 5 in a case where the serial spots welding is performed.

FIG. 10 is a flowchart showing the exemplary operation of the friction stir spot welding device according to Embodiment 5 in a case where the serial spots welding is performed.

As shown in FIG. 10, the serial spots welding operation performed by the friction stir spot welding device 50 according to Embodiment 5 is basically the same as that of the friction stir spot welding device 50 according to Embodiment 1 except that step S103D is performed instead of step S103, in the serial spots welding operation performed by the friction stir spot welding device 50 according to Embodiment 5.

Specifically, in a case where the controller 51 determines that the temperature Tn obtained in step S101 is higher than the first reference temperature T1 (Yes in step S102), the controller 51 sets the plunging force applied by the tool to press the object 60 and the actuation time of the tool (step S103D), and moves to step S104. At this time, the controller 51 sets the plunging force applied by the tool and the actuation time of the tool so that the plunging force is less than the plunging force at the first reference temperature T1 and the actuation time is shorter than the actuation time at the first reference temperature T1.

Alternatively, the controller 51 may set the plunging force of the tool which is greater than the plunging force of the tool which is set in Embodiment 1, so long as (provided that) the plunging force is less than the plunging force at the first reference temperature T1. Further, the controller 51 may set the actuation time of the tool which is longer than the actuation time of the tool which is set in Embodiment 4, so long as the actuation time is shorter than the actuation time at the first reference temperature T1.

This makes it possible to prevent the metal material from being excessively softened and the softened material from moving toward the clamp member 54.

The friction stir spot welding device 50 according to Embodiment 5 configured as described above can obtain advantages similar to those of the friction stir spot welding device 50 according to Embodiment 1.

Embodiment 6

In a friction stir spot welding device according to Embodiment 6, the controller compares the temperature of the tool detected by the temperature detector to the reference temperature to set the rotational speed of the tool and the actuation time of the tool. The configuration of the friction stir spot welding device according to Embodiment 6 is similar to that of the friction stir spot welding device according to Embodiment 1, and will not be described in repetition.

Hereinafter, the operation (control method) in a case where the serial spots welding is performed by the friction stir spot welding device 50 according to Embodiment 6 will be described.

[Serial Spots Welding Operation of Friction Stir Spot Welding Device]

Figure 11:
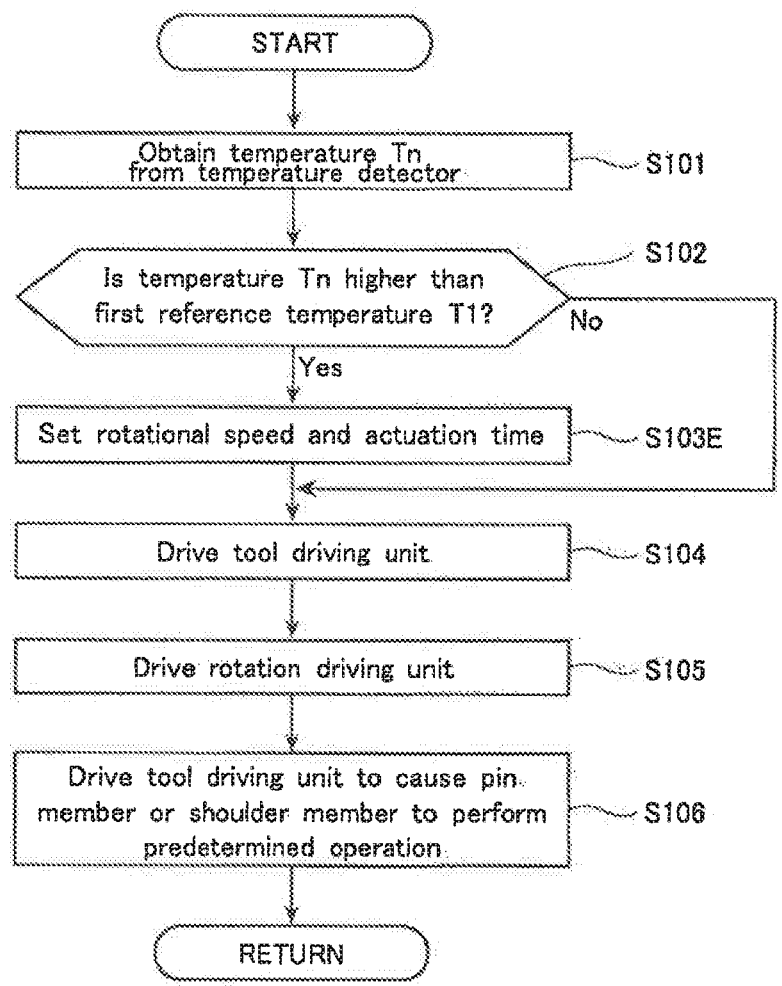
FIG. 11 is a flowchart showing the exemplary operation of a friction stir spot welding device according to Embodiment 6 in a case where the serial spots welding is performed.

FIG. 11 is a flowchart showing the exemplary operation of the friction stir spot welding device according to Embodiment 6 in a case where the serial spots welding is performed.

As shown in FIG. 11, the serial spots welding operation performed by the friction stir spot welding device 50 according to Embodiment 6 is basically the same as that of the friction stir spot welding device 50 according to Embodiment 1 except that step S103E is performed instead of step S103, in the serial spots welding operation performed by the friction stir spot welding device 50 according to Embodiment 6.

Specifically, in a case where the controller 51 determines that the temperature Tn obtained in step S101 is higher than the first reference temperature T1 (Yes in step S102), the controller 51 sets the rotational speed of the tool and the actuation time of the tool (step S103E), and moves to step S104. At this time, the controller 51 sets the rotational speed of the tool and the actuation time of the tool so that the rotational speed is lower than the rotational speed at the first reference temperature T1 and the actuation time is shorter than the actuation time at the first reference temperature T1.

Alternatively, the controller 51 may set the rotational speed of the tool which is higher than the rotational speed of the tool which is set in Embodiment 2, so long as (provided that) the rotational speed is lower than the rotational speed at the first reference temperature T1. Further, the controller 51 may set the actuation time of the tool which is longer than the actuation time of the tool which is set in Embodiment 4, so long as the actuation time is shorter than the actuation time at the first reference temperature T1.

This makes it possible to prevent the metal material from being excessively softened and the softened material from moving toward the clamp member 54.

The friction stir spot welding device 50 according to Embodiment 6 configured as described above can obtain advantages similar to those of the friction stir spot welding device 50 according to Embodiment 1.

Embodiment 7

In a friction stir spot welding device according to Embodiment 7, the controller compares the temperature of the tool detected by the temperature detector to the reference temperature to set the plunging force applied by the tool to press the object, the rotational speed of the tool, and the actuation time of the tool. The configuration of the friction stir spot welding device according to Embodiment 7 is similar to that of the friction stir spot welding device according to Embodiment 1, and will not be described in repetition.

Hereinafter, the operation (control method) performed in a case where the serial spots welding is performed by the friction stir spot welding device 50 according to Embodiment 7 will be described.

[Serial Spots Welding Operation of Friction Stir Spot Welding Device]

Figure 12:
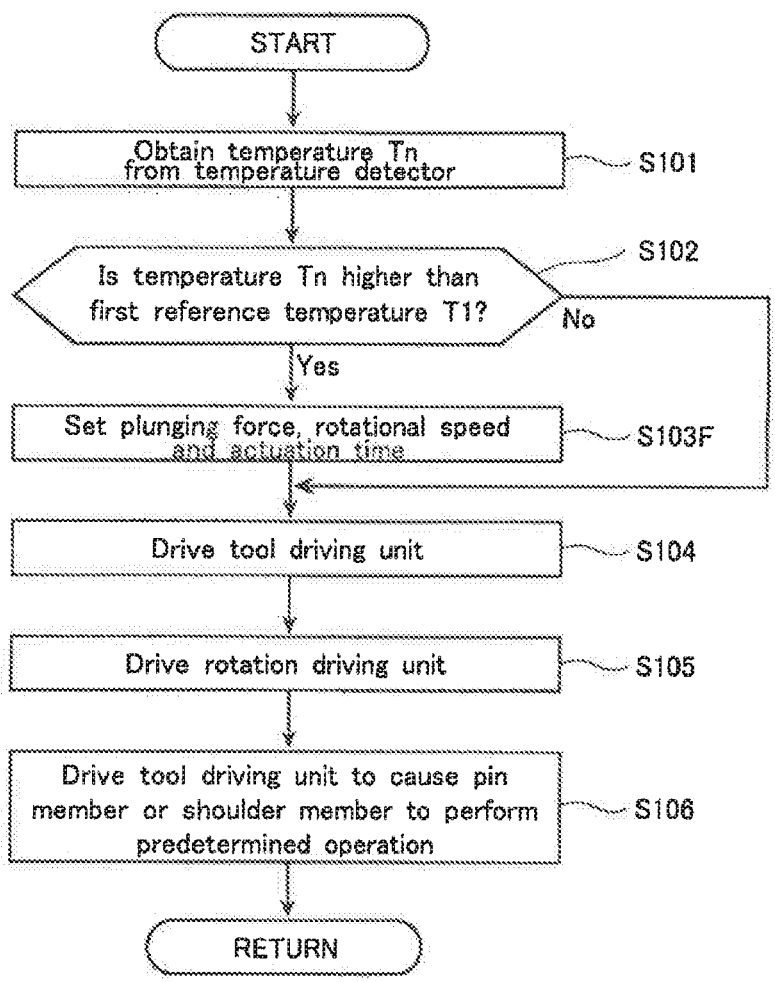
FIG. 12 is a flowchart showing the exemplary operation of a friction stir spot welding device according to Embodiment 7 in a case where the serial spots welding is performed.

FIG. 12 is a flowchart showing the exemplary operation of the friction stir spot welding device according to Embodiment 7 in a case where the serial spots welding is performed.

As shown in FIG. 12, the serial spots welding operation performed by the friction stir spot welding device 50 according to Embodiment 7 is basically the same as that of the friction stir spot welding device 50 according to Embodiment 1 except that step S103F is performed instead of step S103, in the serial spots welding operation performed by the friction stir spot welding device 50 according to Embodiment 7.

Specifically, in a case where the controller 51 determines that the temperature Tn obtained in step S101 is higher than the first reference temperature T1 (Yes in step S102), the controller 51 sets the plunging force applied by the tool to press the object 60, the rotational speed of the tool, and the actuation time of the tool (step S103F), and moves to step S104. At this time, the controller 51 sets the plunging force applied by the tool, the rotational speed of the tool, and the actuation time of the tool so that the plunging force is less than the plunging force at the first reference temperature T1, the rotational speed is lower than the rotational speed at the first reference temperature T1, and the actuation time is shorter than the actuation time at the first reference temperature T1.

Alternatively, the controller 51 may set the plunging force applied by the tool which is greater than the plunging force applied by the tool which is set in Embodiment 1, so long as (provided that) the plunging force is less than the plunging force at the first reference temperature T1. In addition, the controller 51 may set the rotational speed of the tool which is higher than the rotational speed of the tool which is set in Embodiment 2, so long as the rotational speed is lower than the rotational speed at the first reference temperature T1. Further, the controller 51 may set the actuation time of the tool which is longer than the actuation time of the tool which is set in Embodiment 4, so long as the actuation time is shorter than the actuation time at the first reference temperature T1.

This makes it possible to prevent the metal material from being excessively softened and the softened material from moving toward the clamp member 54.

The friction stir spot welding device 50 according to Embodiment 7 configured as described above can obtain advantages similar to those of the friction stir spot welding device 50 according to Embodiment 1.

Although the friction stir spot welding devices 50 according to Embodiment 1 to Embodiment 7 are double-acting friction stir spot welding devices, the present invention is not limited to these, and the friction stir spot welding device may be a single-acting friction stir spot welding device.

Numerous modifications and alternative embodiments of the present invention will be apparent to those skilled in the art in view of the foregoing description. Accordingly, the description is to be construed as illustrative only, and is provided for the purpose of teaching those skilled in the art the best mode of conveying out the invention. The details of the structure and/or function may be varied substantially without departing from the spirit of the invention. Further, various inventions can be made by appropriately combining a plurality of constituents disclosed in the above-described embodiments.

INDUSTRIAL APPLICABILITY

A friction stir spot welding device and a friction stir spot welding method of the present invention are useful in that a good welding quality can be realized even in a case where serial spots welding is performed.

REFERENCE SIGNS LIST

11 pin member
11a tip end portion
12 shoulder member
12a tip end portion
21 temperature detector
31 memory unit
32 input unit
41 clamp driving unit
50 friction stir spot welding device
51 controller
52 tool fixing unit
53 tool driving unit
54 clamp member
54a tip end portion
55 support section
56 member
56a support surface
57 rotation driving unit
60 object
61 metal plate
62 metal plate
521 rotational tool fixing unit
522 clamp fixing unit
531 pin driving unit
532 shoulder driving unit

The invention claimed is:

1. A friction stir spot welding device which welds an object to be welded, by softening the object by friction heat and by stirring the object, the friction stir spot welding device comprising:

a tool with a cylindrical shape, the tool being rotatable around an axis thereof, advanceable along a direction of the axis, and retractable along the direction of the axis;

a temperature detector that detects a temperature of the tool; and a controller configured to weld a plurality of serial spot welds on the object, to compare i) a detected temperature of the tool (Tn), which is detected by the temperature detector in a time period which passes from end of a first weld of the plurality of serial spot welds until a start of a next second weld of the plurality of serial spot welds, to (ii) predetermined reference temperatures, and to set a plunging force (Fn) applied by the tool to press the object in the next second weld using the detected temperature of the tool (Tn) according to the following formula:

$$Fn=F1-((Tn-T1)/(T2-T1))\times F2, \text{ wherein:}$$

the predetermined reference temperature includes a first predetermined reference temperature and a second predetermined reference temperature, which is higher than the first predetermined reference temperature, and the first predetermined reference temperature is designated by (T1), the second predetermined reference temperature is designated by (T2), a plunging force applied by the tool to press the object at the first predetermined reference temperature is designated by (F1), and a plunging force applied by the tool to press the object at the second predetermined reference temperature is designated by (F2).

2. The friction stir spot welding device according to claim 1, wherein the controller is configured to compare the detected temperature of the tool (Tn) at the start of the first weld to the predetermined reference temperatures.

3. The friction stir spot welding device according to claim 1, wherein the controller is configured to compare the detected temperature of the tool (Tn) in the time period to the predetermined reference temperatures to set a rotational speed of the tool for the next second weld.

4. The friction stir spot welding device according to claim 3, wherein the controller is configured to reduce the rotational speed of the tool so that the rotational speed is lower than a rotational speed at the first predetermined reference temperature (T1) when the detected temperature of the tool (Tn) is higher than the first predetermined reference temperature (T1).

5. The friction stir spot welding device according to claim 1, wherein the controller is configured to compare the detected temperature of the tool (Tn) in the time period to the predetermined reference temperatures to set an actuation time of the tool in the next second weld.

6. The friction stir spot welding device according to claim 5, wherein the controller is configured to reduce the actuation time of the tool so that the set actuation time is shorter than the an actuation time at the first predetermined reference temperature (T1) when the detected temperature of the tool (Tn) is higher than the first predetermined reference temperature (T1).

7. The friction stir spot welding device according to claim 1, further comprising:
a clamp member that is advanceable and retractable in the direction of the axis,
wherein the temperature detector detects a temperature of the clamp member as the temperature of the tool.

* * * * *